US006996282B1

(12) United States Patent
Kondo et al.

(10) Patent No.: US 6,996,282 B1
(45) Date of Patent: Feb. 7, 2006

(54) ENCODING APPARATUS, ENCODING METHOD, DECODING APPARATUS, DECODING METHOD, AND RECORD MEDIUM

(75) Inventors: Tetsujiro Kondo, Tokyo (JP); Hiroshi Ichiki, Saitama (JP); Kenji Tanaka, Chiba (JP)

(73) Assignee: Sony Corporation, Tokyo (JP)

( * ) Notice: Subject to any disclaimer, the term of this patent is extended or adjusted under 35 U.S.C. 154(b) by 909 days.

(21) Appl. No.: 09/586,205

(22) Filed: Jun. 2, 2000

Related U.S. Application Data

(63) Continuation of application No. PCT/JP99/05513, filed on Oct. 6, 1999.

(30) Foreign Application Priority Data

Oct. 6, 1998 (JP) ................................. 10-283991

(51) Int. Cl.
G06K 9/36 (2006.01)

(52) U.S. Cl. ..................................... 382/239; 382/251

(58) Field of Classification Search ................ 382/237, 382/239, 232, 247, 252, 244–251; 341/99; 358/115
See application file for complete search history.

(56) References Cited

U.S. PATENT DOCUMENTS

| 5,161,036 A | | 11/1992 | Mannichi et al. ........... 358/466 |
| 5,394,250 A | * | 2/1995 | Shono ....................... 358/3.03 |
| 5,790,704 A | * | 8/1998 | Rao et al. .................... 382/237 |
| 5,793,892 A | * | 8/1998 | Pan et al. .................... 382/232 |
| 5,828,326 A | * | 10/1998 | Kikuchi ....................... 341/99 |
| 5,930,398 A | * | 7/1999 | Watney ....................... 382/239 |

FOREIGN PATENT DOCUMENTS

| JP | 56-143766 | 11/1981 |
| JP | 61-264865 | 11/1986 |
| JP | 64-22185 | 1/1989 |
| JP | 5-73683 | 3/1993 |
| JP | 10-22836 | 1/1998 |

* cited by examiner

Primary Examiner—Bhavesh M. Mehta
Assistant Examiner—Duy M. Dang
(74) Attorney, Agent, or Firm—Frommer Lawrence & Haug LLP; William S. Frommer

(57) ABSTRACT

Corresponding to the compared results of threshold values of uniformly random numbers supplied from a uniformly random number generator and pixel values of an original picture signal, each pixel value of the original picture signal is encoded. The resultant encoded picture signal is transmitted. When a decoding apparatus receives transmission data, the decoding apparatus cumulates encoded values of the transmission data for each pixel value, counts the number of cumulation times, and decodes the cumulated encoded values for each pixel value of the original picture signal corresponding to the number of cumulation times.

39 Claims, 14 Drawing Sheets

*Fig. 3A*
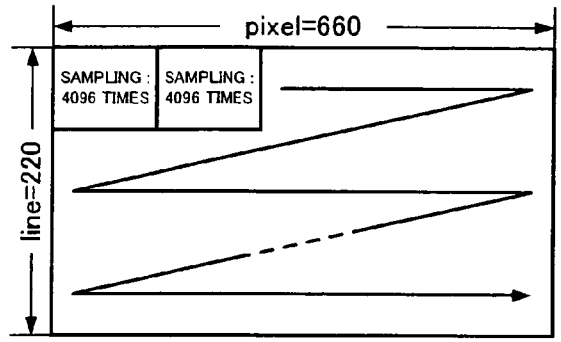
*Fig. 3B*
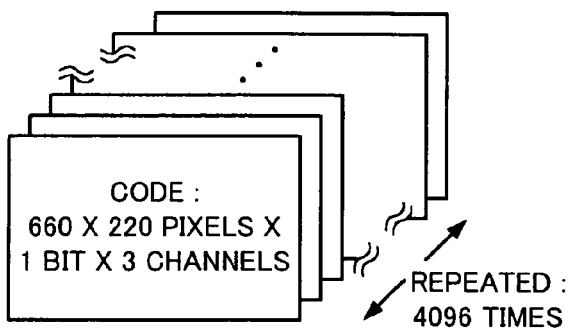
*Fig. 3C*
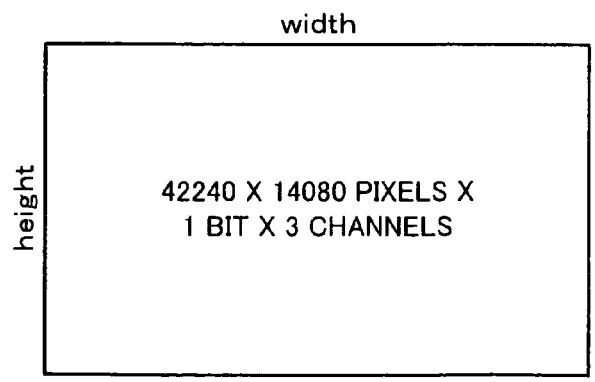
*Fig. 4*
width
height
42240 X 14080 PIXELS X
1 BIT X 3 CHANNELS

*Fig.* 6

ENCODING APPARATUS, ENCODING METHOD, DECODING APPARATUS, DECODING METHOD, AND RECORD MEDIUM

This is a continuation of copending International Application PCT/JP99/05513 having an international filing date of Oct. 6, 1999.

TECHNICAL FIELD

The present invention relates to an encoding apparatus, an encoding method, a decoding apparatus, a decoding method, and a record medium for transmitting information such as picture information.

RELATED ART

A conventional signal format for transmitting picture information is defined considering a particular resolution, a particular number of gradation levels, and so forth, Thus, the resolution, the number of gradation levels, and so forth of a picture decoded corresponding to transmitted information depend on those of a picture that has been encoded.

A signal format of which a resolution range and a gradation-range are hierarchically recorded is known (refer to for example Japanese Patent Laid-Open Publication No. 7-99646). However, in such a signal format, the selection ranges for the resolution and the number of gradation levels are pre-limited. Alternatively, many calculations are required in the decoding process. In addition, a circuit dedicated for the calculations is required. Thus, the conventional format cannot be used generally and practically.

Therefore, a picture format that allows the resolution, the number of gradation levels, and so forth of decoded data to be freely selected has been desired.

DISCLOSURE OF THE INVENTION

The present invention is made from the above-described point of view. An object of the present invention is to accomplish a picture format that allows the resolution and the number of gradation levels of decoded data to be freely selected.

Claim 1 of the present invention is an encoding apparatus comprising a uniformly random number generating portion for generating uniformly random numbers, and an encoding portion for encoding each pixel value of an original picture signal based on a compared result of at least one threshold value that is set based on the uniformly random numbers and a pixel value of the original picture signal.

Claim 11 of the present invention is a decoding apparatus for decoding an original picture signal from an encoded picture signal of which each pixel value of an original picture signal is encoded based on a compared result of a threshold value that is set based on a uniformly random number and a pixel value of the original picture signal, the encoded picture signal having an encoded value for each pixel value, comprising a cumulating portion for cumulating the encoded values of the encoded picture signal for each pixel value of the original picture signal, and a decoding portion for decoding the encoded values cumulated by the cumulating portion for each pixel value of the original picture signal based on the number of times counted by a counting portion.

Claim 22 of the present invention is an encoding method comprising the steps of generating uniformly random numbers, and encoding each pixel value of an original picture signal based on a compared result of at least one threshold value that is set based on the uniformly random numbers and a pixel value of the original picture signal.

Claim 23 of the present invention is a decoding method for decoding an original picture signal from an encoded picture signal of which each pixel value of an original picture signal is encoded based on a compared result of a threshold value that is set based on a uniformly random number and a pixel value of the original picture signal, the encoded picture signal having an encoded value for each pixel value, comprising the steps of cumulating the encoded values of the encoded picture signal for each pixel value of the original picture signal, counting the number of times cumulated at the cumulating step, and decoding the encoded values cumulated at the cumulating step for each pixel value of the original picture signal based on the number of times counted at the counting step.

Claim 24 of the present invention is a record medium from which a computer reads a program that causes the computer to perform the steps of generating uniformly random numbers, and encoding each pixel value of an original picture signal based on a compared result of at least one threshold value that is set based on the uniformly random numbers and a pixel value of the original picture signal.

Claim 25 of the present invention is a record medium from which a computer reads a program that causes the computer to decode an original picture signal from an encoded picture signal of which each pixel value of an original picture signal is encoded based on a compared result of a threshold value that is set based on a uniformly random number and a pixel value of the original picture signal, the encoded picture signal having an encoded value for each pixel value, the program comprising the steps of cumulating the encoded values of the encoded picture signal for each pixel value of the original picture signal, counting the number of times cumulated at the cumulating step, and decoding the encoded values cumulated by the cumulating portion for each pixel value of the original picture signal based on the number of times counted at the counting step.

Claim 26 of the present invention is an encoding apparatus, comprising a uniformly random number generating portion for generating uniformly random numbers, and an encoding portion for encoding an original signal based on a compared result of at least one threshold value that is set based on the uniformly random numbers and each signal value of the original signal.

Claim 29 of the present invention is a decoding apparatus for decoding an original signal from an encoded signal of which each signal value of an original signal is encoded based on a compared result of a threshold value that is set based on a uniformly random number and a signal value of the original signal, the encoded signal having an encoded value for each signal value, comprising a cumulating portion for cumulating the encoded values of the encoded signal for each signal value of the original signal, a counting portion for counting the number of times cumulated, and a decoding portion for decoding the encoded values cumulated by the cumulating portion for each signal value of the original signal based on the number of times counted by the counting portion.

Claim 30 of the present invention is an encoding method, comprising the steps of generating uniformly random numbers, and encoding each signal value of an original signal based on a compared result of at least one threshold value that is set based on the uniformly random numbers and each signal value that is an information unit of the original signal.

Claim 31 of the present invention is a decoding method for decoding an original signal from an encoded signal of which each signal value of an original signal is encoded based on a compared result of a threshold value that is set based on a uniformly random number and a signal value of the original signal, the encoded signal having an encoded value for each signal value, comprising the steps of cumulating the encoded values of the encoded signal for each signal value of the original signal, counting the number of times cumulated, and decoding the encoded values cumulated at the cumulating step for each signal value of the original signal based on the number of times counted at the counting step.

Claim 32 of the present invention is a record medium from which a computer reads a program that causes the computer to perform the steps of generating uniformly random numbers, and encoding each signal value of an original signal based on a compared result of at least one threshold value that is set based on the uniformly random numbers and each signal value of the original signal.

Claim 33 of the present invention is a record medium from which a computer reads a program that causes the computer to decode an original signal from an encoded signal of which each signal value of an original signal is encoded based on a compared result of a threshold value that is set based on a uniformly random number and a signal value of the original signal, the encoded signal having an encoded value for each signal value, the program comprising the steps of cumulating the encoded values of the encoded signal for each signal value of the original signal, counting the number of times cumulated, and decoding the encoded values cumulated at the cumulating step for each signal value of the original signal based on the number of times counted at the counting step.

In the encoding apparatus according to claim 1 of the present invention, each pixel value of an original picture signal is encoded based on a compared result of at least one threshold value that is set based on uniformly random numbers and a pixel value of the original picture signal.

In the decoding apparatus according to claim 11 of the present invention, encoded values of an encoded picture signal of which each pixel value of an original picture signal is encoded based on a compared result of a threshold value that is set based on a uniformly random number and a pixel value of the original picture signal, the encoded picture signal having an encoded value for each pixel value, are cumulated for each pixel value of the original picture signal. The number of times cumulated is counted. The encoded values cumulated for each pixel value of the original picture signal are decoded based on the counted value.

In the encoding method according to claim 22 of the present invention, each pixel value of an original picture signal is encoded based on a compared result of at least one threshold value that is set based on uniformly random numbers and a pixel value of the original picture signal.

In the decoding method according to claim 23 of the present invention, encoded values of an encoded picture signal of which each pixel value of an original picture signal is encoded based on a compared result of a threshold value that is set based on a uniformly random number and a pixel value of the original picture signal, the encoded picture signal having an encoded value for each pixel value, are cumulated for each pixel value of the original picture signal. The number of cumulation times is counted. The encoded values cumulated are decoded for each pixel value of the original picture signal based on the counted value.

In the record medium according to claim 24 of the present invention, a program for encoding each pixel value of an original picture signal based on a compared result of at least one threshold value that is set based on uniformly random numbers and a pixel value of the original picture signal is recorded. The program is controlled by a computer. When necessary, the program is read from the record medium.

In the record medium according to claim 25 of the present invention, a program for cumulating encoded values of an encoded picture signal of which each pixel value of an original picture signal is encoded based on a compared result of a threshold value that is set based on a uniformly random number and a pixel value of the original picture signal, the encoded picture signal having an encoded value for each pixel value, for each pixel value of the original picture signal, counting the number of times cumulated, and decoding the encoded values cumulated for each pixel value of the original picture signal based on the counted value is recorded. The program is controlled by a computer. When necessary, the program is read from the record medium.

In the encoding apparatus according to claim 26 of the present invention, each signal value of an original signal is encoded based on a compared result of at least one threshold value that is set based on uniformly random numbers and each signal value of the original signal.

In the decoding apparatus according to claim 29 of the present invention, encoded values of an encoded signal of which each signal value of an original signal is encoded based on a compared result of a threshold value that is set based on a uniformly random number and a signal value of the original signal are cumulated for each signal value of the original signal. The number of cumulating times are counted. The encoded values cumulated are decoded for each signal value of the original signal based on the counted value.

In the encoding method according to claim 30 of the present invention, each signal value of an original signal is encoded based on a compared result of at least one threshold value that is set based on uniformly random numbers and each signal value that is an information unit of the original signal.

In the decoding method according to claim 31 of the present invention, encoded values of an encoded signal of which each signal value of an original signal is encoded based on a compared result of a threshold value that is set based on a uniformly random number and a signal value of the original signal, the encoded signal having an encoded value for each signal value, are cumulated for each signal value of the original signal. The number of cumulating times is counted. The encoded values cumulated are decoded for each signal value of the original signal based on the counted value.

In the record medium according to claim 32 of the present invention, a program for encoding each signal value of an original signal based on a compared result of at least one threshold value that is set based on uniformly random numbers and each signal value of the original signal is recorded. The program is controlled by a computer. When necessary, the program is read from the record medium.

In the record medium according to claim 33 of the present invention, a program for cumulating encoded values of an encoded signal of which each signal value of an original signal is encoded based on a compared result of a threshold value that is set based on a uniformly random number and a signal value of the original signal, the encoded signal having an encoded value for each signal value, for each signal value of the original signal, counting the number of times cumulated, and decoding the encoded values cumulated for each signal value of the original signal based on the counted number is recorded. The program is controlled by a computer. When necessary, the program is read from the record medium.

BRIEF DESCRIPTION OF DRAWINGS

FIGS. 2 and 3 are schematic diagrams for explaining an encoding process according to the embodiment of the present invention;

FIG. 4 is a schematic diagram for explaining a code generated according to the embodiment of the present invention;

BEST MODES FOR CARRYING OUT THE INVENTION

Figure 1:
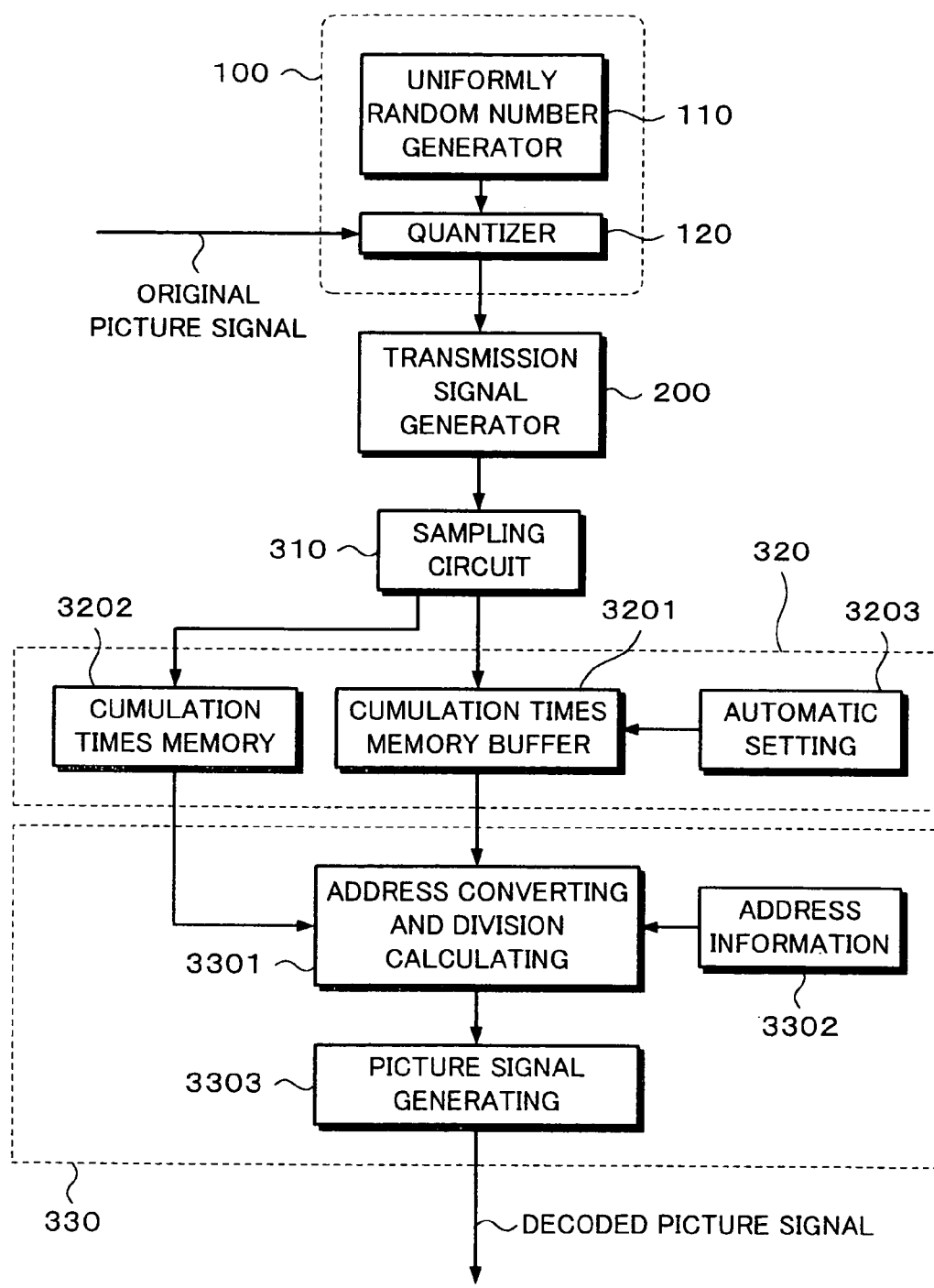
FIG. 1 is a block diagram for explaining the overall structure of an embodiment of the present invention.

Next, with reference to FIG. 1, the overall structure of an information processing system according to an embodiment of the present invention will be described. In FIG. 1, an encoding portion 100 has a uniformly distributed random number generator 110 and a quantizer 120. An original picture signal is supplied to the quantizer 120. Uniformly random numbers generated by the uniformly distributed random number generator 110 are supplied to the quantizer 120. The quantizer 120 raster-scans the original picture signal with the random numbers received as threshold values from the uniformly distributed random number generator 110 and digitizes each pixel value of the original picture signal. The quantizer 120 repeats this operation for example 4096 times so as to generate a code as a set of digitized values. The uniformly random numbers used as threshold values are in a dynamic range that represents each pixel value of the original picture signal.

The code generated by the encoding portion 100 is supplied to a transmission signal generator 200. The transmission signal generator 200 adds a synchronous signal such as a horizontal synchronous signal, a vertical synchronous signal, a sequential picture synchronous signal, or the like to the code received from the quantizer so as generate a transmission signal. When the original picture signal is an analog signal, the synchronous signal is the same as for example a synchronous signal for an NTSC TV signal. When the original picture signal is a digital signal, the synchronous signal is for example synchronous information as header information. In the following description, it is assumed that the original picture signal is a digital signal. The minimum information unit of the transmission signal in the decoding process is referred to as packet. A synchronous signal is added to a particular position of each packet. To suppress an error that takes place during the signal transmission from affecting the code, before the code is converted into a transmission signal, the code may be re-arranged.

On the other hand, a decoding portion 300 has a sampling circuit 310, a cumulating circuit 320, and a decoding circuit 330. In the state that the horizontal synchronization, vertical synchronization, or entire picture synchronization are established corresponding to the synchronous signal of the transmission signal, the sampling circuit 310 receives a transmission signal, samples part of a code in the received transmission signal as digitized values, and supplies the sampled values to the cumulating circuit 320. The cumulating circuit 320 cumulates the sampled values and updates the number of sampling times. The decoding circuit 330 calculates each pixel value of the decoded picture corresponding to the sampled values as cumulated digitized values and the number of sampling times.

Figure 2:
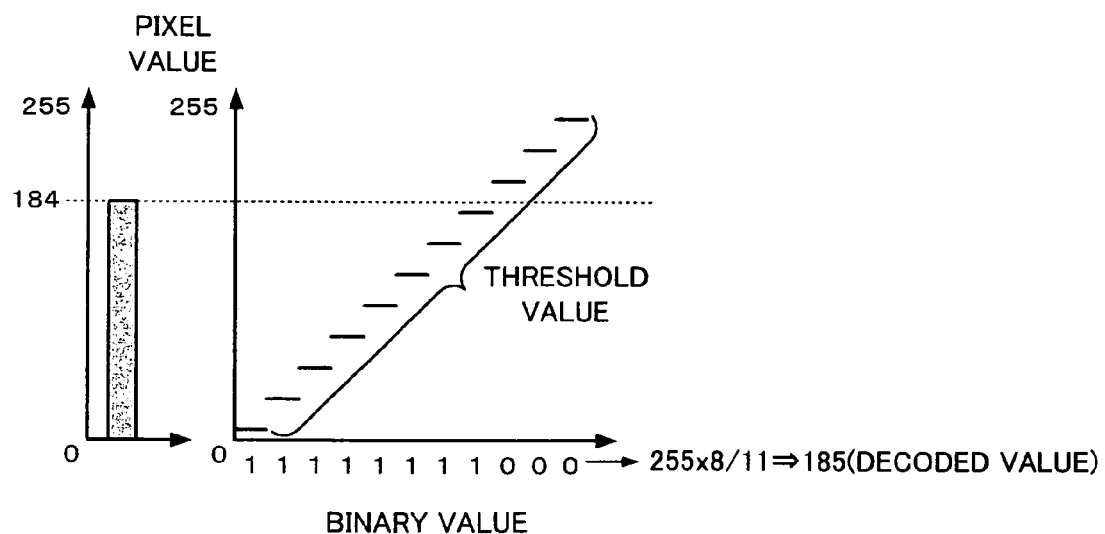

Next, the encoding process of the encoding portion 100 for the original picture signal will be described in detail. First of all, as an example of the digitizing process for one pixel value, the case of which one pixel value is 184 in the gradation level ranging from 0 to 255 as shown in FIG. 2 will be described. In this example, the pixel value is repeatedly digitized 11 times with 11 types of threshold values that are uniformly distributed in the range from 0 to 255. The ratio of values of 184 or smaller to these threshold values is almost equal to the ratio of 184 to 255.

In other words, since the value of (184÷255)×11 is around 7.9, eight types of threshold values are 184 or smaller. Thus, eight of 11 digitized values obtained in the digitizing process performed 11 times are for example "1". The other three digitized values are for example "0". However, when each threshold value is equal to or smaller than the pixel value, the digitized value may be "0". Otherwise, the digitized value may be "1". More generally, the relation expressed by formula (1) is satisfied.

$$I/D \approx P \qquad (1)$$

where I is a pixel value; Dr is a gradation level; and p is the ratio of which a threshold value is equal to or smaller than a pixel value.

With a code as a set of digitized values obtained by the digitizing process with reference to many threshold values that are uniformly distributed, each pixel value of an original picture is represented. In other words, in the above-mentioned example, since the number of "1s" of 11 digitized values is 8, because of 255×(8/11)≈185, the calculated result is around 185. Thus, it is clear that the calculated result that is almost equal to the original pixel value (184) can be restored. When the decoding portion 300 calculates a decoded pixel value, as a benefit, the number of calculations is relatively small.

The accuracy of a code that represents pixel values of an original picture signal is proportional to the number of times of digitizing process (namely, the number of threshold values that are uniformly distributed and referenced in the digitizing process). As a method for generating threshold values that are uniformly distributed, according to the embodiment of the present invention, uniformly random numbers are used. In this case, uniformly random numbers are random numbers that are uniformly distributed in the level range of a current picture signal. Alternatively, a sequence of numbers whose values vary in a predetermined order (other than random numbers generated by a so-called random generator) may be used as uniformly random numbers. As another alternative method, threshold values for pixels at predetermined positions of a picture may be fixed values.

Next, with reference to FIGS. 3A and 3B, the case of which the above-described code generating process is performed for one frame of a picture signal will be described. FIG. 3A shows an example of an original picture. In the example, the original picture is composed of 660×220 pixels (each pixel has eight bits=256 gradation levels). In addition, the original picture has three channels of R, G, and B. As will be described later, the number of pixels in the horizontal direction of the original picture is denoted by pixel, whereas the number of pixels in the vertical direction of the original picture is denoted by line. Thus, in this example, pixel=660 and line=220. All the picture signal of the original picture is digitized in the raster-scan method with threshold values of uniformly random numbers 4096 times (see FIG. 3B). Thus, a code as shown in FIG. 3C is obtained. It should be noted that the digitizing process may be performed other than 4096 times. As described above, a code having information sufficient for obtaining a decoded picture with high picture quality is proportional to the number of times of the digitizing process. In addition, it should be noted that the digitizing process for all the picture signal of the original picture may be performed in other than the raster-scan method.

In the example, the case of which the original picture signal is a digital signal represented with eight bits was described. However, the present invention can be applied to the case that the original picture signal is an analog signal. When the original picture signal is an analog signal, before the digitizing process is performed, it is necessary to limit the amplitude of the signal in a predetermined width using for example an AGC (Automatic Gain Control) circuit. Regardless of whether the original picture signal is a still picture or a moving picture, the present invention can be applied.

Next, the decoding process performed by the decoding portion 300 will be described. In this example, the case of which the code that has been generated in the above-mentioned method is decoded will be described. In this case, the code contained in the transmission signal can be treated as a virtual plate of which 660×4096 (=2703360) pixels and 220×4096 (=901120) pixels are arranged as a matrix in the horizontal direction and the vertical direction, respectively (see FIG. 4). As will be described later, the number of pixels in the horizontal direction of the virtual frame of the code and the number of pixels in the vertical direction of the virtual frame of the code are denoted by width and line, respectively. Thus, in this example, width=2703369 and line=901120. A proper number of digitized values corresponding to the picture quality of a decoded picture to be generated is sampled by the sampling circuit 310. The number of digitized values that are sampled is proportional to the required picture quality of the decoded picture. Alternatively, when a picture is encoded, a desired number of digitized values may be sampled without consideration of the picture quality of the decoded picture. When the encoded picture is decoded, a proper number of digitized values are decoded in consideration of the desired picture quality. As described above, the ratio of the number of "1s" of the sampled digitized values to the total number of sampled digitized values is approximated to that of which pixel values of the original picture are normalized in the range from 0 to 1.0.

As the number of sampling times of the sampling circuit 310 increases (namely, the sampling period shortens), the approximation accuracy improves to some extent. Thus, a picture with a gradation similar to the original picture can be decoded. However, it should be noted that when the number of sampling times for the same pixel exceeds a particular value, the approximation accuracy does not improve. In reality, in consideration of a desired picture quality of a picture to be restored, all the pixel values are thinned out to a required and sufficient number of pixels and then sampled. As examples of the method for thinning out pixel values, (1) the sampling period is widened so as to simply decrease the number of sampling times, (2) pixel values are thinned out in such a manner that the sampling positions of pixel values of each even-numbered frame are different from the sampling positions of pixel values of each odd-numbered frame, (3) each second frame or each second field is skipped, (4) pixel values are thinned out in such a manner that they are weighted corresponding to color features of color signal components R, G, and B or Y, U, and V. In this example, for simplicity, a code is treated as one frame. However, in reality, the sampling circuit 310 repeatedly samples a code generated corresponding to a sequence of an original picture signal.

Alternatively, when the user thinks that a decoded picture with a sufficient picture quality has been obtained in the middle of the signal transmission, he or she can control the sampling circuit 310 (with an operation panel or the like (not shown)) so that it stops receiving the signal. Since a transmission signal containing a code corresponding to the present invention has a more information amount than the conventional signal format for transmitting picture signal, when it is necessary to improve the efficiency of the data transmission to some extent, the process for stopping the reception of the signal is effective. Instead of the user's operation, a determining portion for determining the picture quality of a decoded picture may be disposed. When the determining portion determines that the picture quality is superior to a predetermined criteria, the determining portion may cause the sampling circuit 310 to stop receiving the signal. In this case, the picture quality may be evaluated using an auto correlation, the average value of adjacent difference values, or the like of the decoded picture.

Next, with reference to FIG. 1, the structures and operations of the cumulating circuit 320 and the decoding circuit 330 will be described in detail. The cumulating circuit 320 has a cumulation times memory buffer 3201, a cumulation times memory 3202, and an automatic setting circuit 3203. The cumulation times memory buffer 3201 cumulates digitized values supplied from the sampling circuit 310 corresponding to sampling addresses so as to count the number of times of which digitized values are "1". The cumulation times memory buffer 3201 supplies the cumulation times value to the decoding circuit 330. The cumulating circuit 320 counts the number of digitized values supplied from the sampling circuit 310 and supplies the counted value to the decoding circuit 330. The automatic setting circuit 3203 sets the operation of the cumulation times memory buffer 3201. For example, when the cumulation times value becomes a predetermined value, the automatic setting circuit 3203 causes the cumulation times memory buffer 3201 to stop. On the other hand, the decoding circuit 330 has an address converting and division calculating circuit 3301 and an address information circuit 3302. The address information circuit 3302 stores variables pixel', line', and depth' that characterize a decoded picture. The address information circuit 3302 supplies these variables to the address converting and division calculating circuit 3301. As will be described later, the variables pixel', line', and depth' represent the number of pixels in the horizontal direction of a decoded picture, the number of vertical pixels in the vertical direction thereof, and the maximum value of the gradation value thereof, respectively. The address converting and division calculating circuit 3301 performs an address converting process and a process for dividing the cumulated value by the cumulation times value corresponding to the cumulated value supplied from the cumulation times memory buffer 3201, the cumulation times value supplied from the cumulation times memory 3202, and an address value of the decoded picture supplied from the address information circuit 3302. When a picture signal that lasts for a long time is decoded, a large storage capacity record medium such as a tape or a disc may be used instead of the cumulation times memory buffer 3201. In addition, the operational conditions of the automatic setting circuit 3203, the address information circuit 3302, and so forth may be designated by the user or the like. Alternatively, they may be automatically controlled corresponding to the performance of a picture display portion.

Thereafter, the decoding circuit 330 calculates the pixel density corresponding to the cumulation value supplied from the cumulating circuit 320 and the cumulation times value. In other words, the decoding circuit 330 divides the cumulation value by the cumulation times value and thereby obtains the density of each pixel (namely, each pixel value of the original picture is normalized in the range from 0 to 1.0). In addition, by multiplying the pixel density by the number of gradation levels (such as 256 gradation levels) of the picture to be decoded, the decoding circuit 330 obtains a pixel value. In other words, with the gradation value Dr and the pixel density p, the decoding circuit 330 calculates a pixel value I corresponding to the following formula (2). At this point, the gradation value Dr may be different from a gradation value of the current pixel that has not been encoded.

$$I = Dr \times p \qquad (2)$$

According to the embodiment of the present invention shown in FIG. 1, a code generated by the encoding portion 100 is directly supplied to the transmission signal generator 200. The transmission signal generator 200 converts the code into a transmission signal and supplies it to the decoding portion 300. Alternatively, a code generated by the encoding portion 100 or a transmission signal generated by the transmission signal generator 200 may be recorded to a record medium. The code or the transmission signal may be supplied to the decoding portion 300 through the record medium. In other words, the present invention can be applied to a storage type contents providing service.

As practical examples of the method for transmitting picture data, (1) a process for digitizing a transmission picture in the raster-scan order is repeated a desired number of times and (2) a process for digitizing each pixel a desired number of times and transmitting the resultant pixel is repeated in the raster scan order. The example (1) is suitable when the communication performance on the transmission side is not largely different from that on the reception side. On the reception side, information that is transmitted is thinned out for a predetermined amount and thereby a decoded picture with a required and sufficient picture quality can be obtained. When a moving picture handled, while the number of times of the transmission process is relatively small, an outlined picture of the sequence of the moving picture can be obtained. Corresponding to the outlined picture of the sequence of the moving picture, on the reception side, it can be determined whether or not the moving picture is desired information. On the other hand, the example (2) is suitable in the case that the transmission side can generate transmission data at high speed. In this case, a decoded picture with a picture quality corresponding to the decoding performance of the reception side can be obtained. In other words, when the decoding performance on the reception side is high, a decoded picture with a high picture quality can be obtained.

Figure 5:
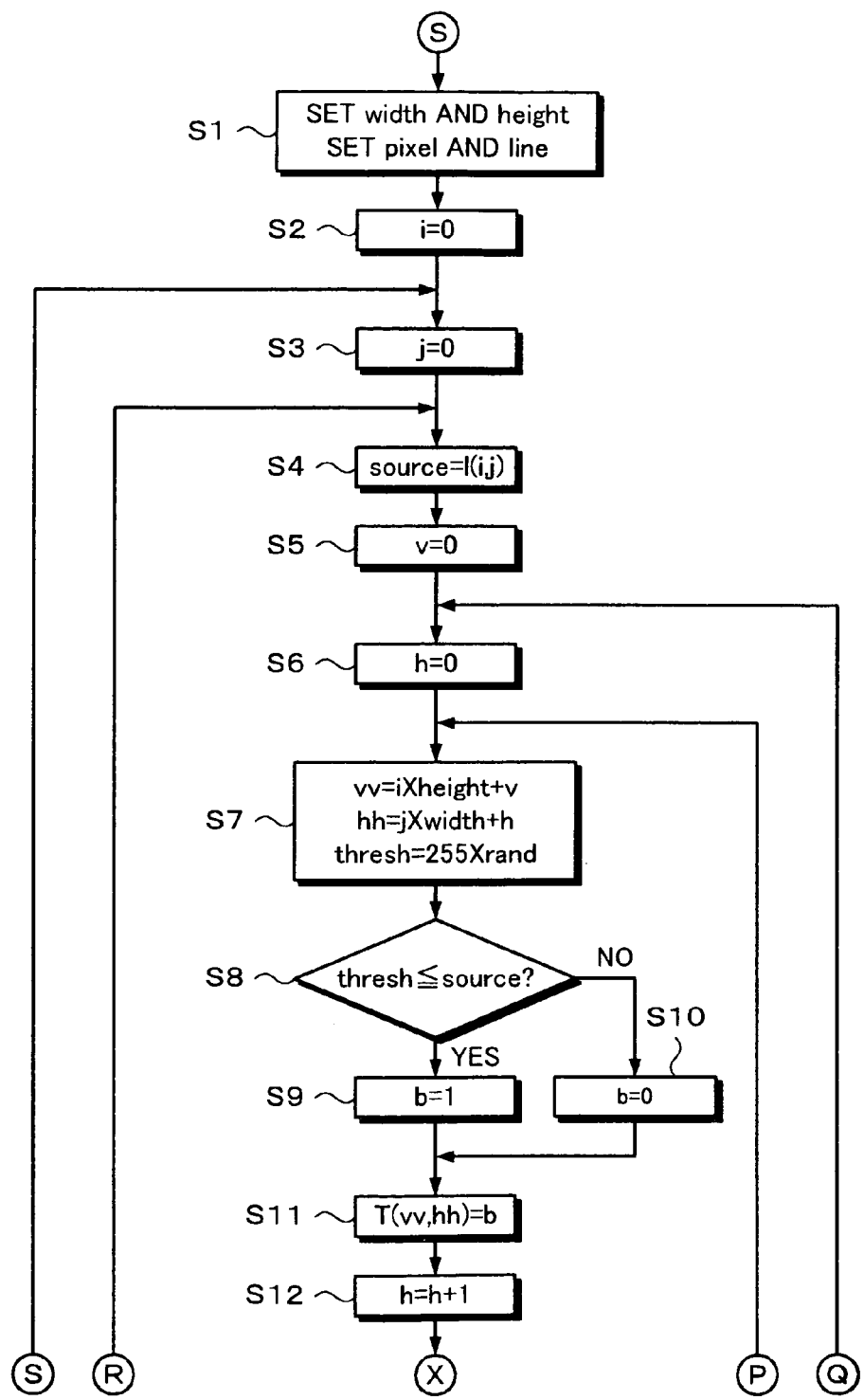
FIG. 5 is a part of a flow chart for explaining the encoding process according to the embodiment of the present invention.
Figure 6:
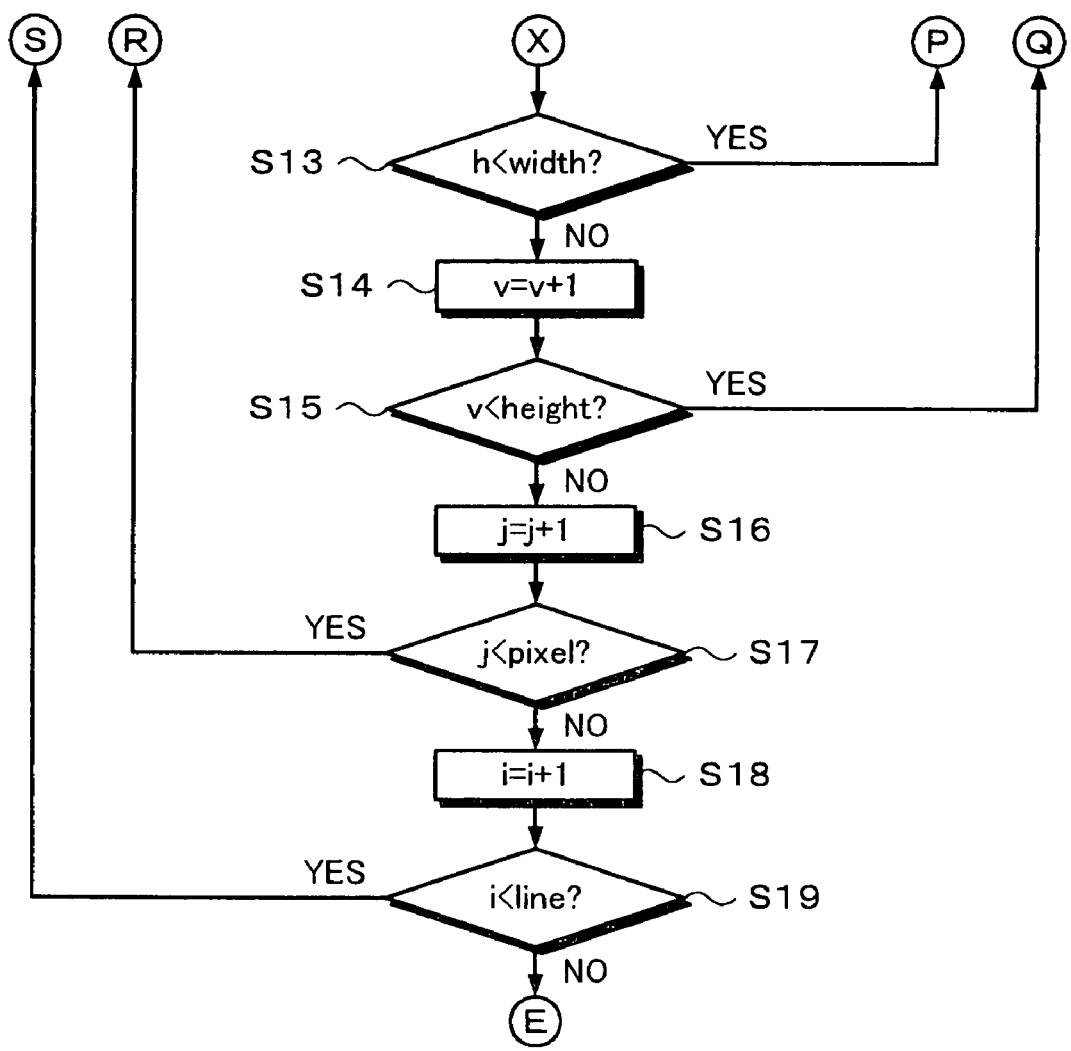
FIG. 6 is another part of the flow chart for explaining the encoding process according to the embodiment of the present invention.

Next, processes according to the embodiment of the present invention will be described. With reference to a flow chart shown in FIGS. 5 and 6, the encoding process will be described. Due to a limited space, the flow chart of the encoding process is shown in FIGS. 5 and 6. In FIGS. 5 and 6, X, P, Q, R, and S show step branch points. At step S1, the encoding portion 100 sets the values of constants width, height, pixel, and line. The constants pixel and line represent the size of an original picture. In other words, the constant pixel represents the number of pixels in the horizontal direction of the original picture. The constant line represents the number of pixels in the vertical direction of the original picture (the number of lines that are raster-scanned). The constant width represents the number of pixels in the horizontal direction of an array of digitized values of a code corresponding to one pixel of the original picture. The constant height represents the number of pixels in the vertical direction of an array of digitized values of a code corresponding to one pixel of the original picture. FIG. 3A shows that pixel=660 and line=220. FIG. 4 shows that width=42240 and height=14080.

At steps S2 and S3, the encoding portion 100 initializes variables i and j, respectively. The variables i and j represent the current pixel position in the horizontal direction and the vertical direction of the original picture, respectively (namely, the coordinates of the current pixel of the original picture). At step S4, the encoding portion 100 sets a pixel value I(i, j) of coordinates (i, j) of the original picture as the value of a variable source that represents a pixel value of the original picture. At steps S5 and S6, the encoding portion 100 initializes variables v and h, respectively. The variable v and h represent the pixel position in the horizontal direction and the vertical direction in the array of digitized values of the code corresponding to one pixel of the original picture.

At step S7, the encoding portion 100 calculates the values of variables vv and hh that represent the data position in the code of the digitized value obtained at step S8. In other words, the variables vv and hh represent the vertical position and the horizontal position of the digitized value in the code (namely, the coordinates of the digitized value in the code). The variable vv is calculated as the sum of i×height that represents the coordinate at the upper edge of the array of digitized values at the lower adjacent position of the array of digitized values corresponding to one pixel of the original picture containing the current data position and the variable v that represents the vertical coordinate of the current data position in the array of digitized values containing the current data position. The variable hh is calculated as the sum of j×width that represents the coordinate at the right edge of the array of digitized values at the left adjacent position of the array of digitized values corresponding to one pixel of the original picture containing the current data position and the variable h that represents the horizontal coordinate of the current data position in the array of digitized values containing the current data position.

At step S7, the encoding portion 100 designates a threshold value. In this case, the encoding portion 100 designates the product of the result of rand ( ) that is a function for obtaining uniformly random numbers in the range from 0 to 1 and the maximum value of the dynamic range such as 255 as the value of a variable thresh that represents the threshold value. The function rand ( ) is a module for receiving uniformly random numbers generated by the uniformly distributed random number generator 110 shown in FIG. 1. Alternatively, uniformly random numbers may be generated by software.

Thereafter, the flow advances to step S8. At step S8, the encoding portion 100 determines whether or not the value of the variable thresh is equal to or smaller than the value of the variable source. When the value of the variable thresh is equal to or smaller than the value of the variable source (namely, the determined result at step S8 is Yes), the flow advances to step S9. Otherwise, the flow advances to step S10. At step S9, the encoding portion 100 set a variable b that represents a digitized value to "1" (namely, b="1"). On the other hand, at step S10, the encoding portion 100 sets the variable b to "0" (namely, b= "0"). Thus, the digitizing process is performed corresponding to the value of the variable thresh. Alternatively, at step S9, the encoding portion 100 may set the variable a to "0" (namely, a="0"); at step S10, the encoding portion 100 may set the variable b to "1" (namely, b="1").

After the operation at step S9 or S10 has been completed, the flow advances to step S11. At step S11, the encoding portion 100 sets the value of the variable b as the value of the digitized value at the coordinates (vv, hh) in the code. Whenever the operation at step S11 is performed, one digitized value is decided. Thereafter, the flow advances to step S12. At step S12, the encoding portion 100 adds 1 to the value of the variable h. The operation performed at step S12 is equivalent to an operation of which the horizontal coordinate of the current pixel in the code is moved by one position.

Thereafter, the flow advances to step S13 shown in FIG. 6. At step S13, the encoding portion 100 determines whether or not the value of the variable h is smaller than the value of the variable width (namely, the current pixel of the original picture exceeds the array of digitized values corresponding to one pixel of the original picture in the horizontal direction). When the value of the variable h is smaller than the value of the variable width (namely, the determined result at step S13 is Yes), the flow returns to step S7. At step S7, the encoding portion 100 sets a digitized value with the value of the variable h that has been set at step S12. On the other hand, unless the value of the variable h is smaller than the value of the variable width (namely, the determined result at step S13 is No), the flow advances to step S14.

At step S14, the encoding portion 100 adds 1 to the value of the variable v. The operation performed at step S14 is equivalent to an operation of which the vertical coordinate of the current pixel in the array of digitized values corresponding to one pixel of the original picture is moved by one position. After the operation at step S14 has been completed, the flow advances to step S15. At step S15, the encoding portion 100 determines whether or not the value of the variable v is smaller than the value of the variable height (namely, the current pixel of the original picture exceeds the array of digitized values corresponding to one pixel of the original picture in the vertical direction). When the value of the variable h is smaller than the value of the variable height (namely, the determined result at step S15 is Yes), the flow returns to step S6. At step S6, the encoding portion 100 initializes the value of the variable h. Thereafter, the encoding portion 100 sets a digitized value with the value of the variable v that has been set at step S14. On the other hand, when the value of the variable h is equal to or larger than the value of the variable height (namely, the determined result at step S15 is No), the flow advances to step S16.

At step S16, the encoding portion 100 adds 1 to the value of the variable j. The operation performed at step S16 is equivalent to an operation of which the current position of the original picture is moved in the horizontal direction by one position. After the operation at step S16 has been completed, the flow advances to step S17. At step S17, the encoding portion 100 determines whether or not the value of the variable j is smaller than the value of the variable pixel (namely, the value of the variable j does not exceed the number of pixels in the horizontal direction of the original picture). When the value of the variable j is smaller than the value of the variable pixel (namely, the determined result at step S17 is Yes), the flow returns to step S4. At step S4, the encoding portion sets the value of the variable source that represents the pixel value of the original picture with the value of the variable j that has been set at step S16. Thereafter, the encoding portion 100 performs the digitizing process after step S5.

On the other hand, when the value of the variable j exceeds the value of the variable pixel (namely, the determined result at step S17 is Yes), the flow advances to step S18. At step S18, the encoding portion 100 adds 1 to the value of the variable i. The operation performed at step S18 is equivalent to an operation of which the pixel position of the original picture to be digitized is moved in the vertical direction by one position. After the operation at step S18 has been completed, the flow advances to step S19. At step S19, the encoding portion 100 determines whether or not the value of the variable i is smaller than the value of the variable line (namely, the value of the variable i does not exceed the number of pixels in the vertical direction of the original picture). When the value of the variable i is smaller than the value of the variable line (namely, the determined result at step S17 is Yes), the flow returns to step S3. At step S3, the encoding portion 100 initializes the value of the variable j. Thereafter, the encoding portion 100 successively digitizes pixels of the original picture with the value of the variable i that has been set at step S18.

On the other hand, unless the value of the variable i is smaller than the value of the variable line (namely, the determined result at step S17 is Yes), the encoding portion 100 determines that all pixels of the original picture have been digitized and completes the encoding process. In the above-described encoding method, each pixel of the original picture is digitized with a threshold value given as a uniformly random number so as to generate a code.

Figure 7:
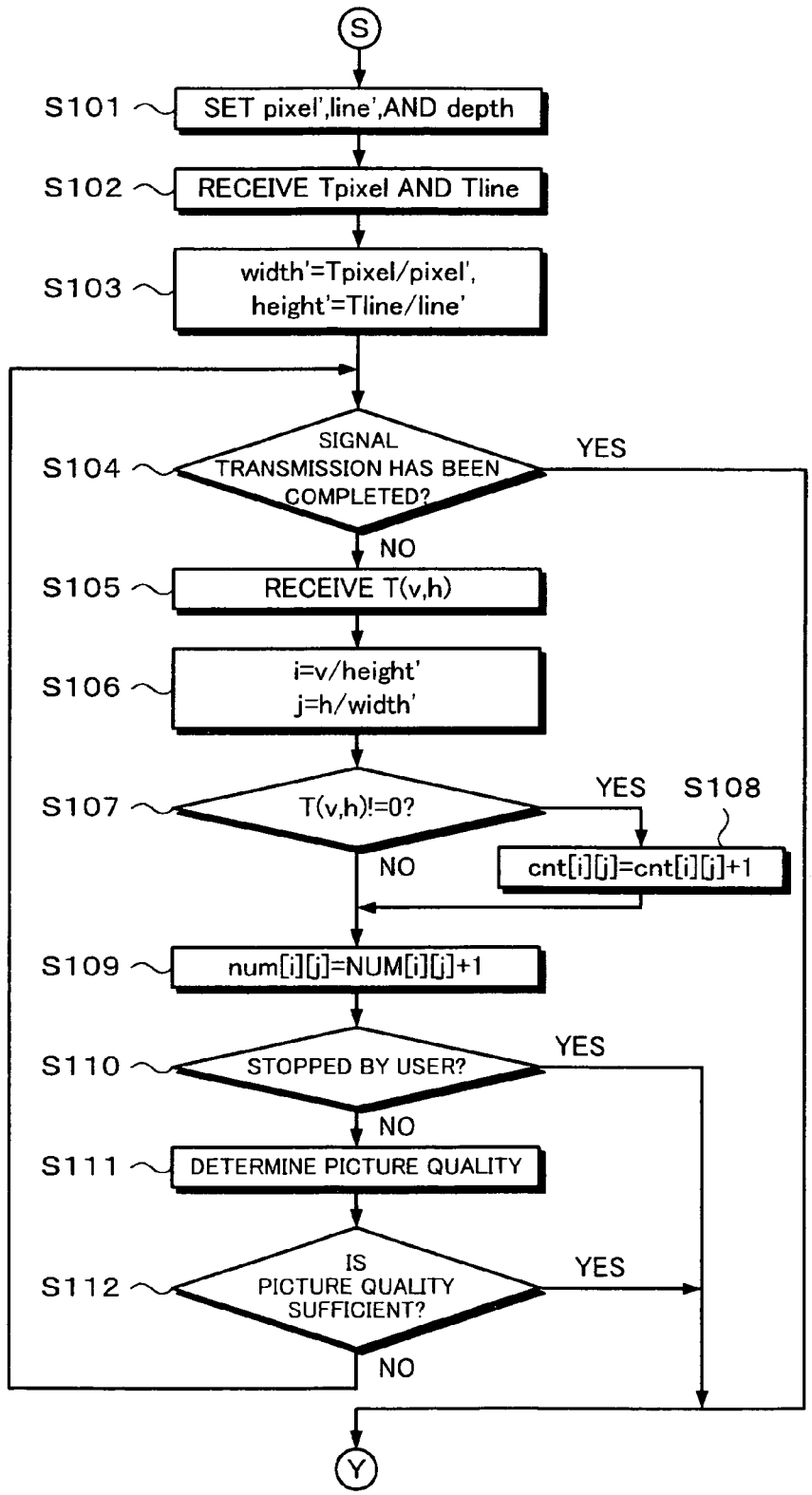
FIG. 7 is a part of a flow chart for explaining a decoding process according to the embodiment of the present invention.
Figure 8:
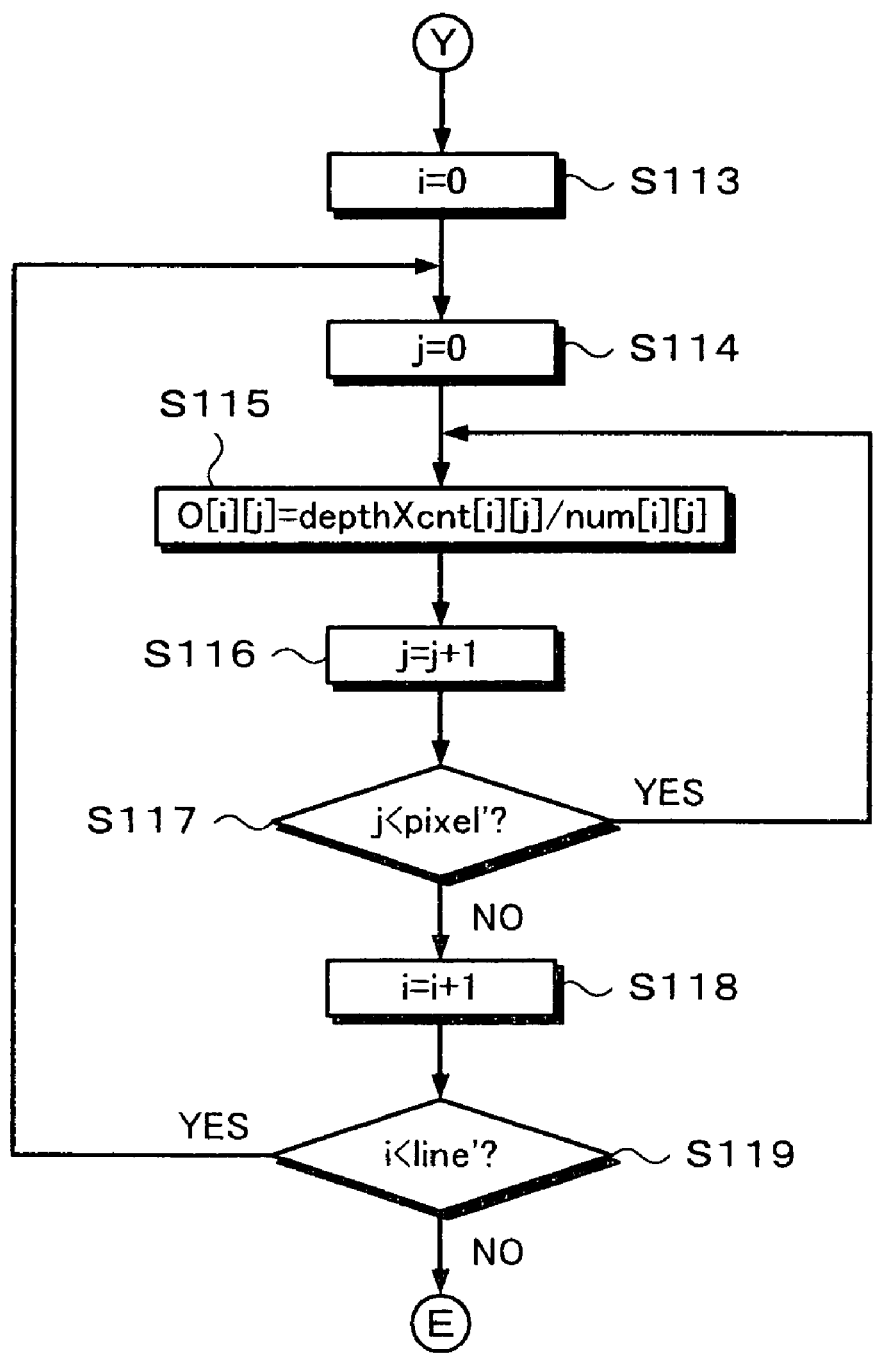
FIG. 8 is another part of the flow chart for explaining the decoding process according to the embodiment of the present invention.

Next, with reference to flow charts shown in FIGS. 7 and 8, a decoding process will be described. Due to a limited space, the flow chart of the decoding process is shown in FIGS. 7 and 8. In FIGS. 7 and 8, Y represents a step branch point of the decoding process. At step S101, the decoding circuit 330 sets the values of variables pixel', line', and depth. The variable pixel'represents the number of pixels in the horizontal direction of a decoded picture. The variable line' represents the number of pixels in the vertical direction of the decoded picture. The variable depth represents the maximum value of the gradation value of the decoded picture. At step S102, the decoding circuit 330 receives the values of variables Tpixel and Tline. The variable Tpixel represents the number of pixels in the horizontal direction of a code. The variable Tline represents the number of pixels in the vertical direction of a code. In this case, the values of the variables Tpixel and Tline are contained in for example a header portion or the like of the above-described transmission signal.

At step S103, the decoding circuit 330 calculates and sets the values of variables width' and height'. In other words, the decoding circuit 330 divides the value of the variable Tpixel that represents the number of pixels in the horizontal direction of the code by the value of the variable pixel' that represents the number of pixels in the horizontal direction of the decoded picture so as to calculate the value of the variable width' that represents the number of pixels in the horizontal direction of the array of digitized values corresponding to one pixel of the decoded picture. Likewise, the decoding circuit 330 divides the value of the variable Tline that represents the number of pixels in the vertical direction of the code by the value of the variable line' that represents the number of pixels in the vertical direction of the decoded picture so as to calculate the value of the variable height' that represents the number of pixels in the vertical direction of the array of digitized values corresponding to one pixel of the decoded picture.

Thereafter, the transmission signal is sent. At step S104, the decoding circuit 330 determines whether or not all data of the transmission signal has been sent. When all data of the transmission signal has been sent (namely the determined result at step S104 is Yes), the flow advances to step S113 shown in FIG. 8. Otherwise, the flow advances to step S105. After step S113, the decoding circuit 330 calculates each pixel value of the decoded picture. The detail of this operation will be described later. At step S105, the decoding circuit 330 receives a digitized value T(v, h) at coordinates (v, h) of the code. Thereafter, the flow advances to step S106. At step S106, the decoding circuit 330 detects coordinates (i, j) of the pixel value of the decoded picture corresponding to the digitized value T(v, h). In other words, the decoding circuit 330 calculates the value of the variable i as an integer portion of which the value of the variable v is divided by the value of the variable height'. On the other hand, the decoding circuit 330 calculates the value of the variable j as an integer portion of which the value of the variable h is divided by the value of the variable width'.

Thereafter, the flow advances to step S107. At step S107, the decoding circuit 330 determines whether or not the digitized value T(v, h) is not "0". When the digitized value T(v, h) is not "0" (namely, the determined result at step S107 is Yes), the flow advances to step S108. Otherwise, the flow advances to step S109. At step S108, the decoding circuit 330 adds 1 to a variable cnt [i] [j] that is a matrix. The variable cnt [i] [j] is a variable used to count the number of digitized values that are not "0" corresponding to pixels at coordinates (i, j) of the decoded picture. Whenever the digitized value T(v, h) is not "0" (namely, the determined result at step S107 is Yes), the value of the variable cnt [i] [t] increments by 1. Finally, the total number of digitized values that are not "0" corresponding to the pixels of the coordinates (i, j) of the decoded picture is stored as the value of the variable cnt [i] [j]. After the operation at step S107 is completed, the flow advances to step S109.

In the decoding process, the case that unless the digitized value T(v, h) is not "0" the digitized value is equal to or smaller than a threshold value was described. Thus, when the digitized value T(v, h) is not "0" (namely, the determined result at step S107 is Yes), the decoding circuit 330 adds 1 to the value of the variable cnt [i] [j]. On the other hand, in the decoding process of which when the digitized value T(v, h) is "0", the digitized value is equal to or smaller than a threshold value, when the digitized value T(v, h) is "0" (namely, the determined result at step S107 is No), "1" is added to the value of the variable cnt [i] [j].

At step S109, the decoding circuit 330 adds 1 to the value of a variable num [i] [j] that is a matrix. The variable num [i] [j] is a variable used to count the number of digitized values corresponding to pixels at coordinates (i, j) of the decoded picture. In other words, regardless of the determined result at step S107, whenever each digitized value T(v, h) is received, the value of the variable num [i] [j] is incremented by 1. Finally, the total number of digitized values corresponding to the pixels at the coordinates (i, j) of the decoded picture is stored as the value of the variable num [i] [j].

Thereafter, the flow advances to step S110. At step S110, the decoding circuit 330 determines whether or not the user has performed the signal transmission stopping operation because a decoded picture having a desired picture quality has been obtained. When the user has performed the signal transmission stopping operation (namely, the determined result at step S110 is Yes), the flow advances to step S113. Otherwise, the flow advances to step S111. At step S111, the decoding circuit 330 determines the picture quality of the decoded picture. In reality, the decoding circuit 330 determines the picture quality of the decoded picture corresponding to an auto correlation, the average value of the differences of adjacent pixels, or the like of the decoded picture. At step S112, the decoding circuit 330 performs a process corresponding to the determined result at step S111. In other words, when the picture quality is sufficient (namely, the determined result at step S112 is Yes), the flow advances to step S113. Otherwise, the flow returns to step S104. At step S104, the decoding circuit 330 repeats the process.

When the transmission signal has been completely sent (namely, the determined result at step S104 is Yes) or when the signal transmission stopping operation has been performed (namely, the determined result at step S112 is Yes), the flow advances to step S113. At step S113, the decoding circuit 330 initializes the value of the variable i. At step S114, the decoding circuit 330 initializes the value of the variable j. Thereafter, the flow advances to step S115. At step S115, the decoding circuit 330 calculates the pixel value at the coordinates (i, j) of the decoded picture and stores the calculated pixel value to a variable O [i] [j] that is a matrix. In other words, the decoding circuit 330 calculates the value of the variable O [i] [j] as the product of the ratio of the value of the variable num [i] [j] that represents the total number of digitized values corresponding to the pixels at the coordinates (i, j) of the decoded picture and the value of the variable cnt [i] [j] that represents the number of digitized values that are not "0" in the digitized valus and the gradation value depth of the decoded picture.

Thereafter, the flow advances to step S116. At step S116, the decoding circuit 330 adds 1 to the value of the variable j. The operation performed at step S116 is equivalent to an operation of which the coordinates of the current pixel of the decoded picture is moved in the horizontal direction by one position. At step S117, the decoding circuit 330 determines whether or not the value of the variable i is smaller than the value of the variable pixel' (namely, the current pixel exceeds the array of digitized values of the decoded picture in the horizontal direction). When the value of the variable j is smaller than the value of the variable pixel' (namely, the determined result at step S117 is Yes), the flow returns to step S115. At step S115, the decoding circuit 330 sets pixel values of the decoded picture with the value of the variable j that has been set at step S116. Otherwise, the flow advances to step S118. At step S118, the decoding circuit 330 adds 1 to the value of the variable i. The operation performed at step S118 is equivalent to an operation of which the coordinates of the current pixel of the decoded picture is moved in the vertical direction by one position.

After the operation at step S18 has been completed, the flow advances to step S119. At step S119, the decoding circuit 330 determines whether or not the value of the variable i is smaller than the value of the variable line' (namely, the current pixel exceeds the array of digitized values of the decoded picture in the vertical direction). When the value of the variable h is smaller than the value of the variable line' (namely, the determined result at step S119 is Yes), the flow returns to step S114. At step S114, the decoding circuit 330 initializes the value of the variable j. At step S115, the decoding circuit 330 calculates the pixel values of the decoded picture with the value of the variable i that has been set at step S118. On the other hand, unless the value of the variable h is smaller than the value of the variable line' (namely, the determined result at step S119 is No), the decoding circuit 330 determines that all pixel values of the decoded picture have been calculated and completes the decoding process.

Figure 9:
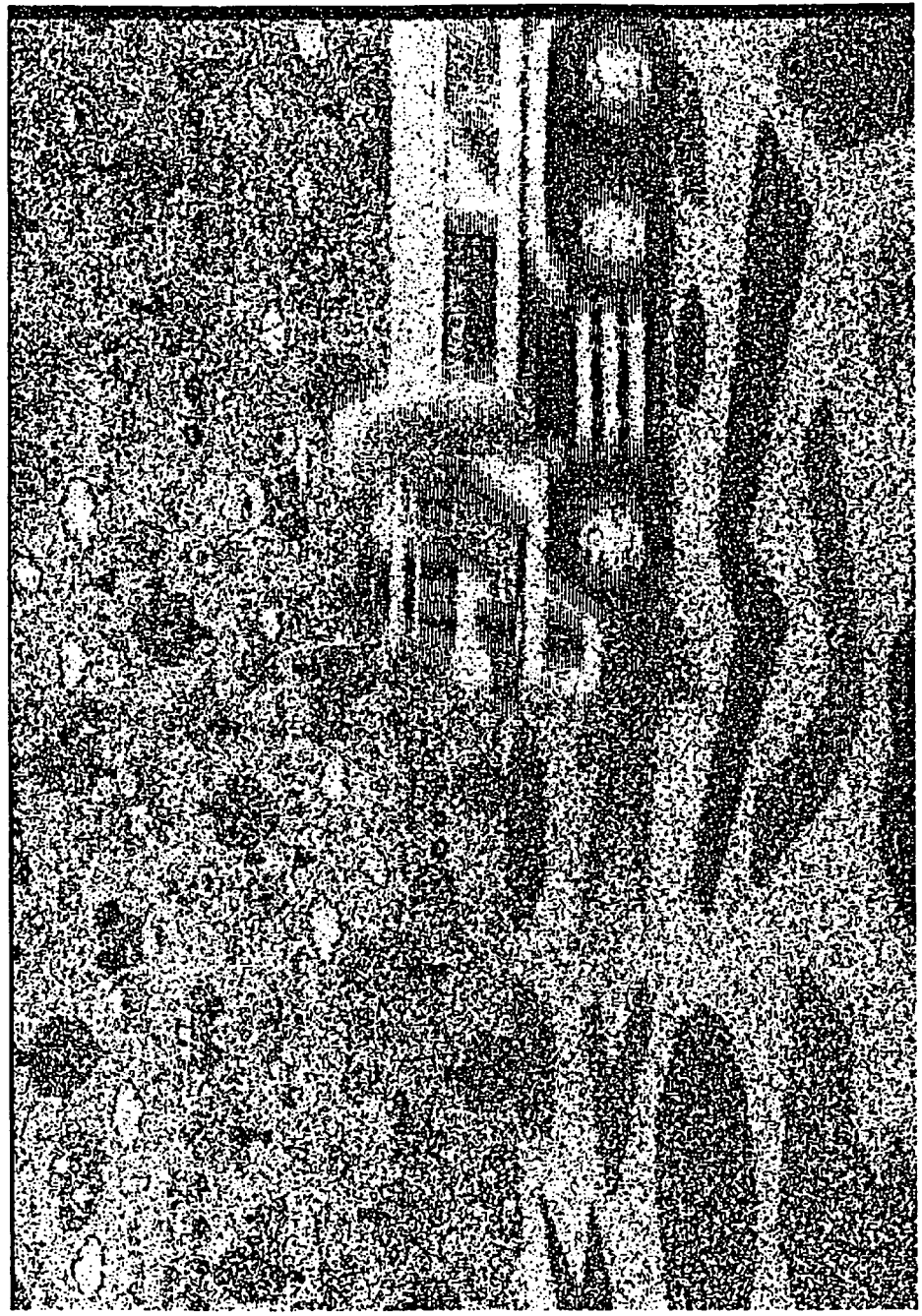
FIG. 9 is a schematic diagram showing an example of a decoded picture according to the embodiment of the present invention.
Figure 10:
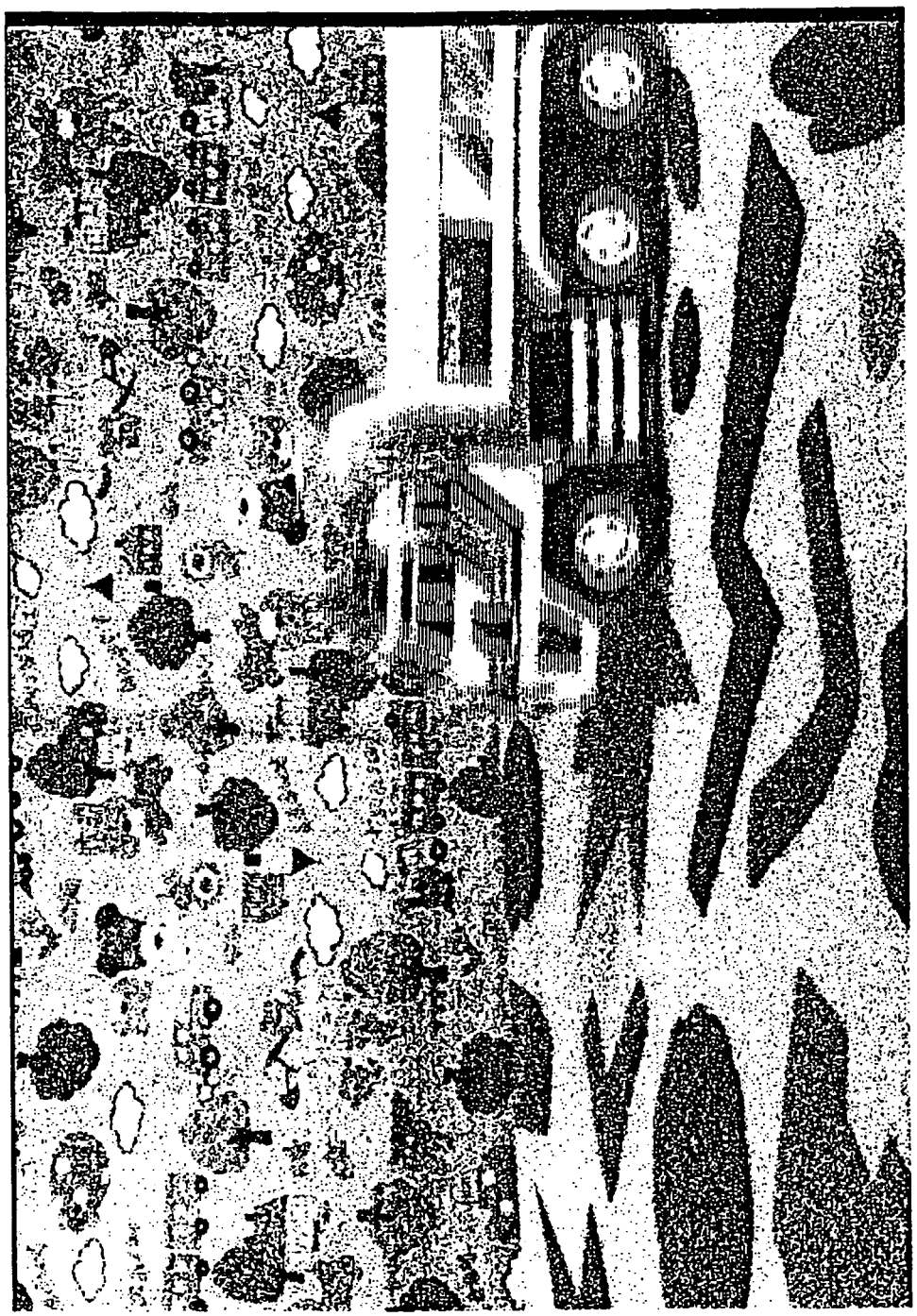
FIG. 10 is a schematic diagram showing another example of a decoded picture according to the embodiment of the present invention.
Figure 11:
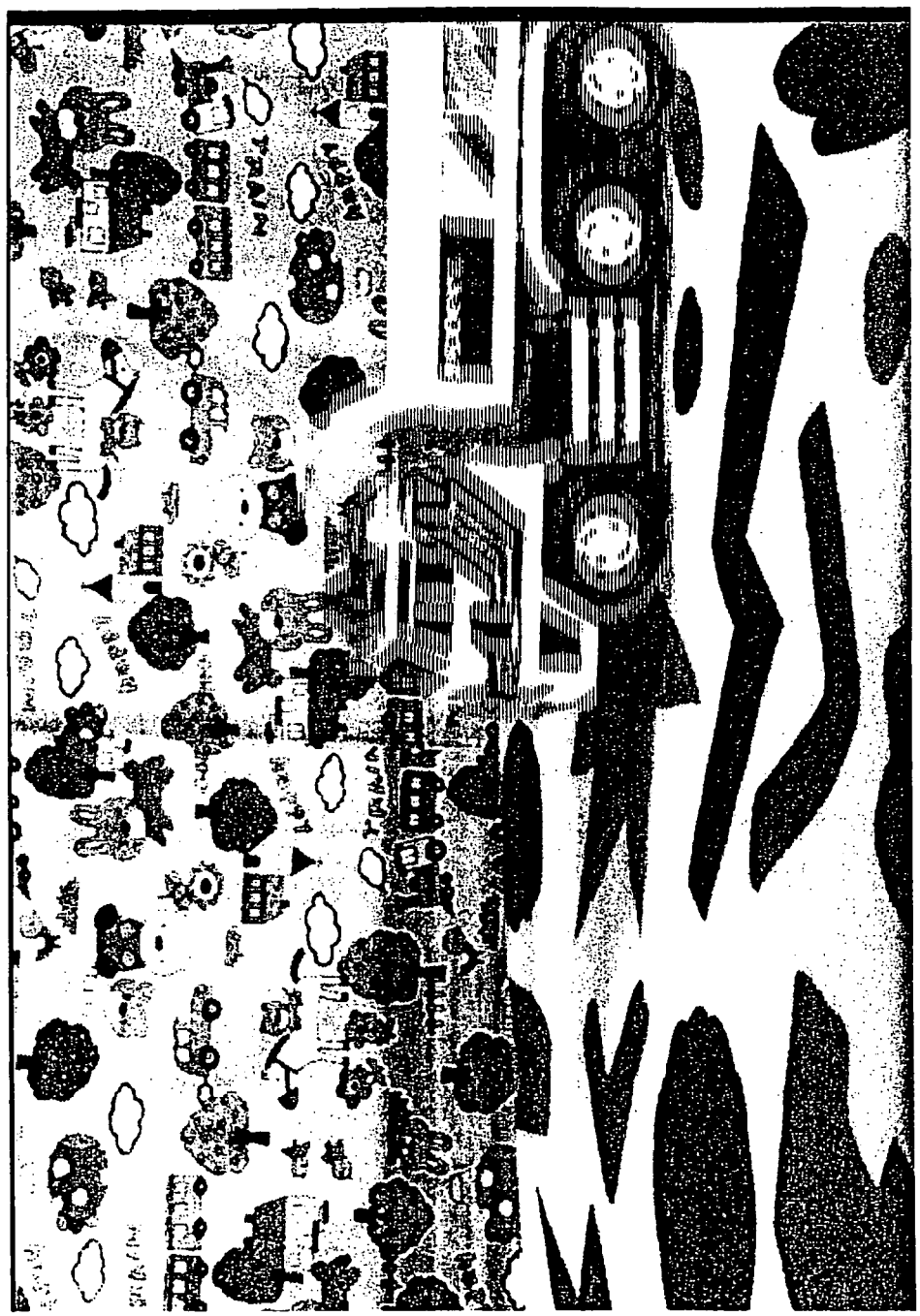
FIG. 11 is a schematic diagram showing another example of a decoded picture according to the embodiment of the present invention.

Next, the relation between the picture quality of a decoded picture obtained according to the embodiment of the present invention and the number of times of the digitizing process will be described. FIGS. 9, 10, and 11 show examples of decoded pictures that are decoded from codes of which an original picture is digitized four times, 32 times, and 400 times, respectively. Thus, it is clear that the picture quality of a decoded picture is proportional to the number of times of the digitizing process. When the number of times of the digitizing process increases, a pattern in an original picture becomes clear. In other words, as the number of transmission times increases, the resolution of a decoded picture improves. In particular, when the number of pixels and the number of gradation levels of a display unit on the reception side are small, a decoded picture with a sufficient picture quality can be obtained in a short time after the signal transmission is started.

In the encoding process and decoding process according to the present invention, picture information is transmitted with a code of which similar digitized information is repeated. Thus, the encoding method and decoding method according to the present invention have several characteristics that are not available in a conventional signal format for transmitting picture information. With such characteristics, various processes can be performed. First of all, the flexibility in the relation between an original picture and a code is large.

Figure 12:
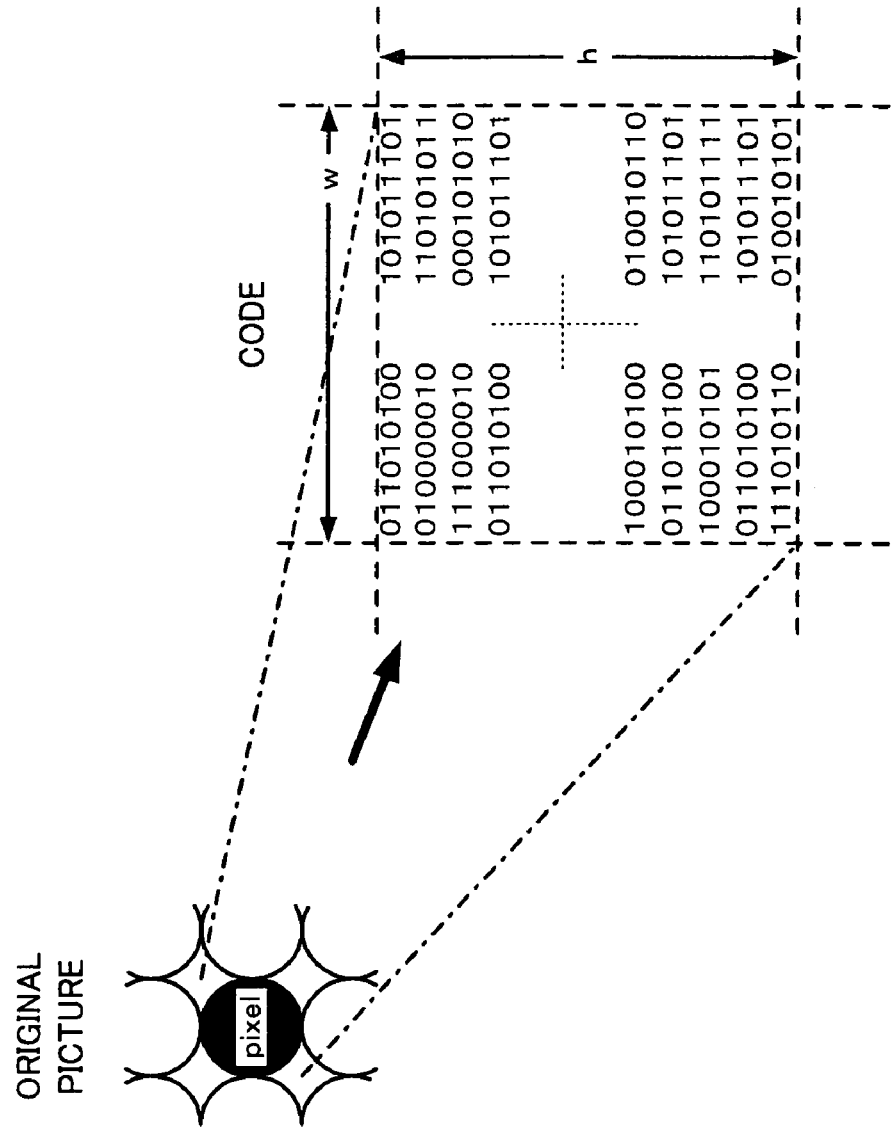
FIG. 12 is a schematic diagram for explaining the relation between one pixel of an original picture and an array of digitized values of a code.

For example, as shown in FIG. 12, an original picture composed of 800 (H)×600 (V) pixels (each pixel has eight bits (256 gradation levels) can be converted into a code of an array of 80000 (=800×100) (H)×72000 (=600×120) (V) digitized values. In this case, width w=100 and height h=120 are just examples. In other words, the values of the width W and the height H may be varied for each apparatus type or the like.

Figure 13:
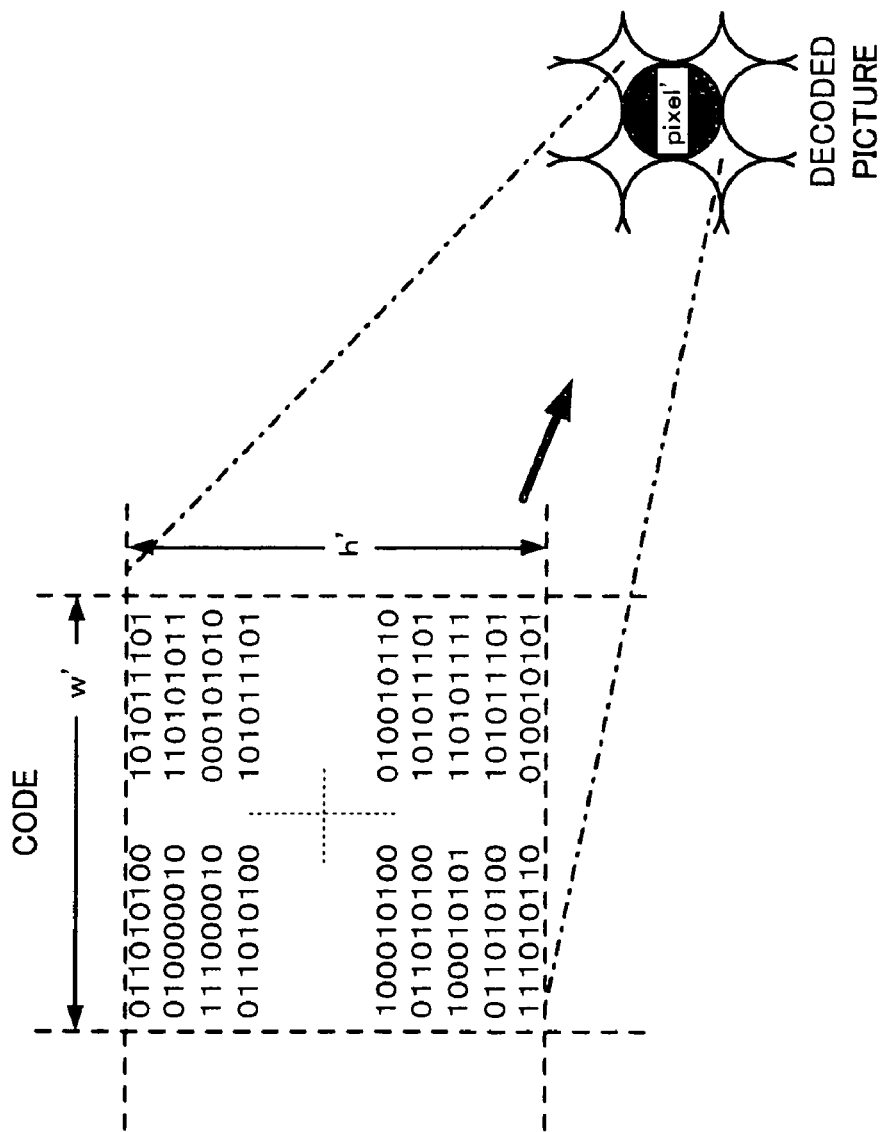
FIG. 13 is a schematic diagram for explaining the relation between an array of digitized values of a code and one pixel of a decoded picture.

When a picture with a gradation is decoded from a code, regardless of the size, the number of pixels, the gradation, and so forth of an original picture, the original picture can be decoded to a picture having a desired number of pixels and a desired number of gradation levels. For example, from a code of which each pixel of an original picture signal is converted into data of 100 (w')×120 (h'), each of which has one bit (two gradation levels) (see FIG. 13), a picture composed of for example 667 (H)×360 (V) pixels having a desired number of gradation levels can be decoded. With any gradation value Dr', a pixel value I' is decoded corresponding to the following formula (2).

$$I'=Dr' \times p \qquad (2)'$$

where p represents the pixel density as with p in formula (2).

Figure 14:
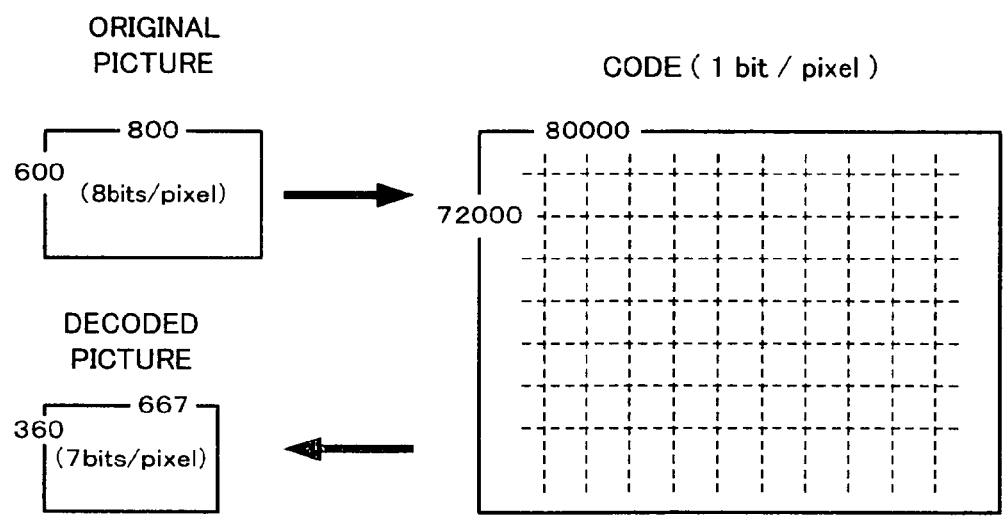
FIG. 14 is a schematic diagram showing an example of the relation among an original picture, a code, and a decoded picture.

Next, with reference to FIG. 14, the above-described encoding process and decoding process will be described in detail. FIG. 14 shows an example of an encoding process for encoding an original picture to a code and a decoding process for decoding a code to a decoded picture having a desired number of gradation levels. For example, an original picture composed of 800 (H)×600 (V) pixels each of which has eight bits (256 gradation levels) can be converted into a code composed of 80000 (H)×72000 (V) digitized values. More generally, when a desired number of digitized values in the horizontal direction and a desired number of digitized value in the vertical direction of a code corresponding to one pixel of the original picture are designated, a desired number of digitized values in the vertical direction and a desired number of digitized values in the horizontal direction of all the code can be designated.

On the other hand, from a code composed of 80000 (H)×72000 (V) digitized values, a picture composed of 667 (R)×360 (V) pixels, each of which has seven bits (128 gradation levels), can be decoded. More generally, when a desired number of digitized values in the horizontal direction of a code and a desired number of digitized values in the vertical direction of the code corresponding to one pixel of a decoded picture are designated, a decoded picture having a desired size, a desired number of pixels, and a desired number of hierarchical levels can be obtained from the code.

As described above, in the encoding process and the decoding process according to the embodiment, it is clear that the flexibility in the relation between an original picture and a decoded picture is large. For example, a process for obtaining a decoded picture that is different from an original picture in the number of pixels, the resolution, the aspect ratio, and so forth that have been set at step S101 can be performed (this process is referred as resizing process). When the number of pixels in the vertical direction and/or the number of pixels in the horizontal direction of the original picture is different from that of the decoded picture, the same effect as the linear interpolating process can be theoretically obtained.

In the encoding process and decoding process according to the embodiment of the present invention, the flexibility of the format of a transmission signal is large. For example, as described above, the array of digitized values of a code corresponding to one pixel of an original picture can be designated corresponding to for example each apparatus type. More practically, (a) the array of digitized values is designated corresponding to the performance of the apparatus type on the transmission side. Alternatively, (b) the array of digitized values is designated corresponding to the performance of the apparatus type on the reception side. In addition, the flexibility of the positions of a synchronous signal and encoding parameters (the size of the original picture, the number of pixels, the number of digitized values as an array of a code, and the number of times of the digitizing process). For example, header information may be contained in a transmission signal. In addition, encoding parameters may be contained in header information. To accurately perform the encoding process and the decoding process according to the present invention, it is necessary to horizontally and vertically synchronize a transmission on the transmission side and the reception side. To do that, a synchronous signal may be added to a transmission signal. Alternatively, synchronizing information may be transmitted from the transmission side to the reception side. One of these methods may be used. When a transmission signal horizontally/vertically synchronizes on the transmission side and the reception side, it is not necessary to receive all the signal on the reception side. By intermittently receiving the signal, a desired amount of the signal can be received.

Next, according to the embodiment, the flexibility of the decoding process can be improved. In other words, since picture information is transmitted with a code of which similar digitized information is repeated, before all the code is transmitted, as long as a synchronization that allows the sampling circuit 310 to sample the picture information at a proper timing is established, the decoding process becomes flexible. Thus, when the minimum unit of transmission data (for example, one packet) has been received, the decoding process can be started any time. Thus, when the receiving process for a transmission signal is started, synchronous information is obtained. After the next sequence, the decoding process can be performed.

In the decoding portion 300, even if the cumulation times value stored in the memory of the cumulating circuit 320 does not precisely match the real cumulation times value stored in the memory buffer, as long as the difference does not affect the result of a dividing operation, the difference does not almost affect the accuracy of the reproduction of pixel values. Thus, it is not necessary to cause the calculations of the decoding process to exactly synchronize with the timing at which stored values in the memory of the cumulating circuit 320 and the memory buffer are updated.

Thus, the cumulating process of the cumulating circuit 320 and the calculating process of the decoding circuit 330 can be performed in parallel. Consequently, in the middle of the signal transmission, an outlined picture of the decoded picture (in particular, the picture quality) can be observed. When the signal transmission is stopped corresponding to the observed result, desired picture information can be more effectively and quickly transmitted than before. In particular, when picture information having a lower picture quality is transmitted corresponding to a decoding process that uses a relatively small amount of information contained in a code, a pseudo displaying process such as dither method can be performed at high speed. Of course, after much information has been transmitted, when the decoding process is performed in such a manner that the update timing of the values stored in the memory of the cumulating circuit 320 matches that of the memory buffer, a decoded picture with a higher picture quality can be obtained.

Alternatively, the user may cause the decoding side to transmit information of a required picture quality for a decoded picture to the encoding side. The encoding side may set encoding conditions such as the number of times of the digitizing process corresponding to the received information. As another alternative method, the decoding side may calculate an auto correlation of the picture or the average value of the adjacent difference values and stop the decoding process corresponding to the calculated result and a threshold value that has been set by the user or the like.

As another alternative method, a part of a decoded picture may be used for non-picture information such as character information. As an example of the method for displaying such information, a portion corresponding to the character information in the code may not be decoded.

Figure 15:
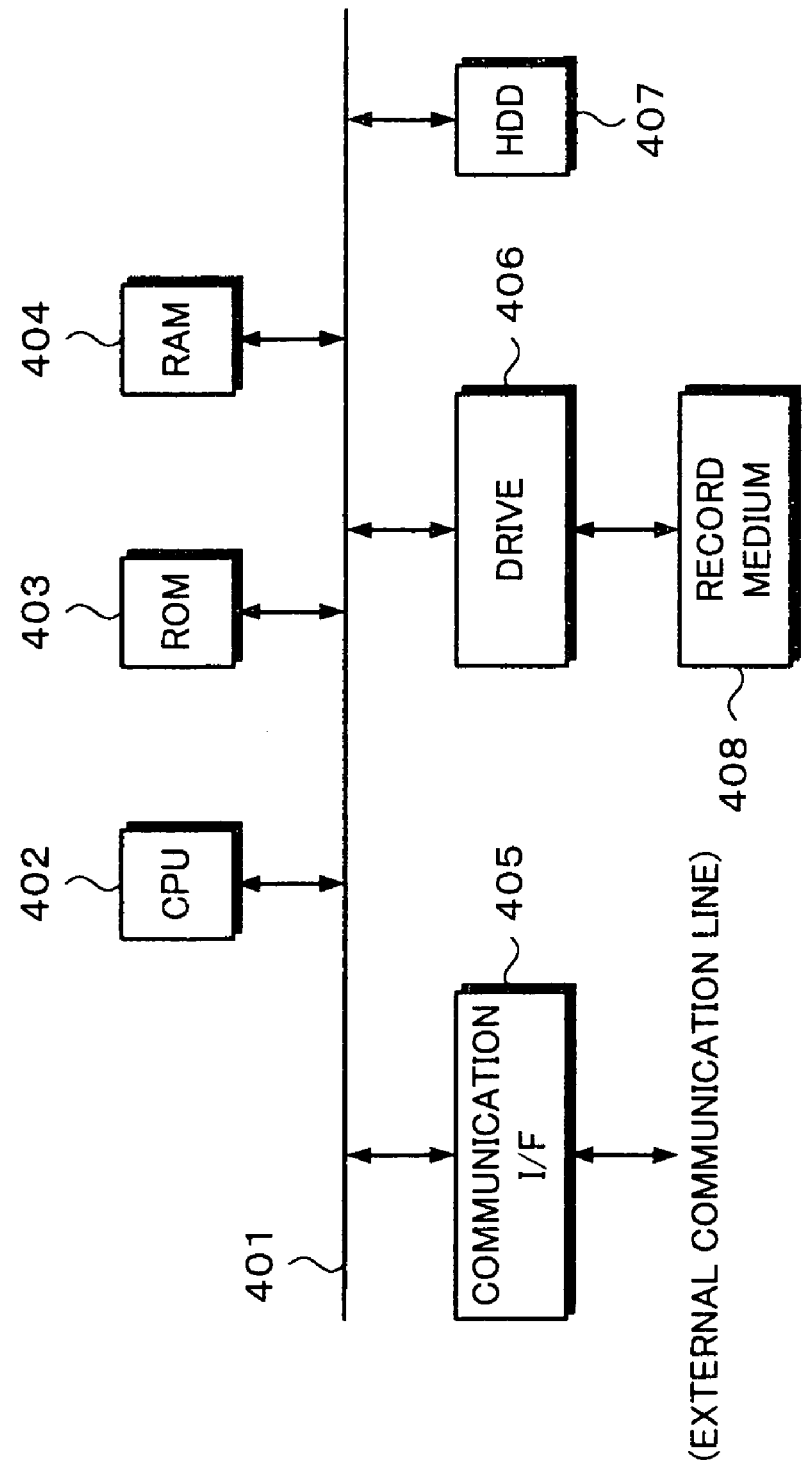
FIG. 15 is a schematic diagram showing an example of an information system according to the present invention.

FIG. 15 shows an example of the structure of a computer system as an information system that performs for example a contents providing service according to the present invention. In FIG. 15, a CPU (Central Processing Unit) 402, a ROM (Read Only Memory) 403, a RAM (Random Access Memory) 404, a communication interface 405, a drive 406, a HDD (Hard Disk Drive) 407, and so forth are connected to a bus 401. The communication interface 405 has an interface function that interfaces with an external communication line. The drive 406 has a function for reproducing data from an attachable/detachable record medium 408 such as an FD (floppy disk) or a CD (compact disc). The HDD 407 is an auxiliary recording portion. In addition to or instead of the HDD 407, an auxiliary recording portion using an optical disc medium or an auxiliary recording portion using a tape shaped record medium may be provided.

An original picture that is recorded on the attachable/detachable record medium 408 and reproduced by the drive 406 and/or that is received as an information signal from an external line such as a telephone line through the communication interface 405 is supplied to the computer system. The computer system performs the above-described encoding process for the received original picture and thereby generates encoded picture data. At this point, software for the encoding process may be supplied from the attachable/detachable record medium 408 and/or as an information signal from the external line such as a telephone line through the communication interface 405. In other words, the computer system performs the encoding process corresponding to the program supplied through a record medium or the like. The generated encoded picture data is recorded to the attachable/detachable record medium 408 by the drive 406. In addition or alternatively, the encoded picture data is transmitted to the external line through the communication interface 405. In addition, corresponding to a program recorded on a record medium, the computer system performs the decoding process.

An encoded picture data that is recorded on the attachable/detachable record medium 408 and reproduced by the drive 406 and/or that is received as an information signal from an external line such as a telephone line through the communication interface 405 is supplied to the computer system. The computer system performs the above-described decoding process for the received encoded picture data and thereby generates a decoded picture. At this point, software for the decoding process may be supplied from the attachable/detachable record medium 408 and/or as an information signal from the external line such as a telephone line through the communication interface 405. In other words, the computer system performs the decoding process corresponding to the program supplied through a record medium or the like.

According to the above-described embodiment of the present invention, picture information is transmitted with a code having two gradation levels. In other words, the picture information is transmitted with a code of which similar digitized information is repeated. Thus, the format of the transmission signal becomes flexible. When an original picture has a picture format of which one pixel is composed of eight bits, the information amount per pixel of the transmission signal becomes 1/8 as small as that of the original picture. In addition, since the transmission signal is composed of binary information of "1" and "0", the transmission rate can be improved. Even if a part of the transmission data contains an error, it does not largely affect the decoded result (substantially, it does not affect the decoded result). Thus, the robustness is high. Although the amount of information that is transmitted increases, because of the above-mentioned benefits, depending on the applications, a remarkable effect can be obtained.

According to the above-described embodiment of the present invention, a code having two gradation levels as a set of digitized values is generated and transmitted. Alternatively, for example three types of threshold values are obtained with an uniformly distributed random number generator. With a quantizing process using these threshold values, a code having four gradation levels is generated. In this method almost the same effect as the present invention may be obtained.

In the above-described embodiment, the present invention is applied to the case that picture data is transmitted. The applicability of the present invention is not limited to such a case. For example, the present invention can be applied to the case that data other than picture data such as audio data can be transmitted.

It should be noted that the present invention is not limited to the above-described embodiment. Instead, the present invention can be applied to various applications and modification within the scope thereof.

As described above, according to the present invention, with reference to threshold values that are set corresponding to uniformly random numbers, pixel values of an original picture signal are digitized. Thus, a code that is a set of the digitized values is generated. Digitized values sampled from such a code are cumulated. The cumulated value is divided by the number of cumulation times. Corresponding to the result of the dividing operation, a decoded picture is obtained.

Such an encoding process and such a decoding process for a picture signal are much simpler than those for a picture signal using scanning lines corresponding to for example the NTSC system. In particular, the number of calculations performed on the reception side (decoding side) becomes very small. Thus, the structures for the encoding process and decoding process and the firmware can be simplified.

For example, the array of digitized values of a code corresponding to one pixel of an original picture can be designated for each apparatus type. In a process for adding a synchronous signal and encoding parameters (such as the size of the original picture, the number of pixels, the number of digitized values in a code, and the number of times of the digitizing process) to the code and generating a transmission signal, the flexibility of the positions of the added information is large. Thus, the format of a transmission signal can be properly selected corresponding to the process for desired picture information.

Alternatively, after an array of digitized values of a code is re-arranged, they can be converted into a transmission signal. In this case, the picture quality of a part of a decoded picture can be prevented from largely deteriorating due to an error that takes place during the signal transmission or on a record medium. Thus, the encoding process and the decoding process can be synchronously performed.

Because of the flexibility of the above-described format, the decoding process can be properly performed without need to sample all the code of the transmission signal. In other words, the decoding process can be performed with a predetermined ratio of all the digitized values of the code. With a sampling period properly designated corresponding to a desired picture quality of the decoded picture or the like, the code of the transmission signal can be properly sampled. Thus, the resolution and the number of gradation levels of the decoded picture can be properly selected. When the decoding apparatus has a sufficient memory and a sufficient calculating circuit, the decoding apparatus can generate a decoded picture having a desired resolution and a desired number of gradation levels. Thus, the degree of freedom of the performance and structure of the decoding apparatus becomes large. Consequently, the decoding apparatus can be designed in consideration of the decreases of the fabrication cost and power consumption.

Because of the flexibility of the formata and the characteristic of which even if the number of cumulation times of the memory does not accurately match the number of cumulation times of the memory buffer, the difference does not substantially affect the picture quality of the decoded picture, the flexibility of the decoding process can be improved. In other words, before all the code has been completely transmitted, under a particular condition of which the transmission signal is synchronized, the decoding process can be performed. Thus, the receiving process for the transmission signal and the decoding process thereof can be performed in parallel.

Thus, in the middle of the signal transmission, an outlined picture of a decoded picture (in particular, the picture quality thereof) can be observed. Corresponding to the observed result, the signal transmission can be stopped. Consequently, desired picture information can be more effectively and quickly transmitted than before. In particular, when the number of display pixels and the number of gradation levels of the display portion on the reception side are small, a decoded picture having a sufficient picture quality can be obtained in a short time after the signal transmission is started. When a signal transmission is quickly performed by a decoding process using a relatively small amount of information of a code, a pseudo displaying process such as dither method can be performed without the increase of the load of calculations of the decoding apparatus. Alternatively, the user may cause the decoding side to transmit information of a required picture quality for a decoded picture to the encoding side. The encoding side may set encoding conditions such as the number of times of the digitizing process corresponding to the received information.

Because of the flexibility of the decoding process, in a contents providing service or the like, both a process for transmitting an outlined picture in a short time and a process for transmitting a precise picture in a relatively long time can be accomplished. Moreover, in the encoding process and decoding process according to the present invention, the flexibility in the relation between an original picture and a picture decoded from a code becomes large. Thus, the resizing process of which a decoded picture that is different from an original picture in the number of pixels, the resolution, the aspect ratio, and so forth is obtained can be performed. In addition, a process for causing part of an original picture not to be displayed can be easily performed.

In a code according to the present invention, the unit of information is small. In addition, the number of gradation levels of a decoded picture is obtained from a code of which the digitizing process is performed a plurality of times. Thus, the influence of an error that takes place in a transmission signal against a decoded picture is small. Consequently, very high robustness can be accomplished. In addition, since a code of which pixel values are digitized is a set of digitized values each of which has one bit, theoretically, an error does not propagate. Consequently, even if the communication environment, the record medium, and so forth do not have high reliability, a good decoded picture can be obtained.

What is claimed is:

1. An encoding apparatus, comprising:
   a uniformly random number generating portion for generating uniformly random numbers;
   an encoding portion for encoding each pixel value of an original picture signal based on a compared result of at least one threshold value that is set based on the uniformly random numbers and a pixel value of the original picture signal; and
   a transmission signal generating portion for adding a synchronous signal that includes at least either a horizontal synchronous signal, a vertical synchronous signal, or a sequential synchronous signal.

2. The encoding apparatus as set forth in claim 1, wherein said encoding portion repeatedly encodes each of all pixel values in a predetermined range of the original picture signal, one pixel value at a time.

3. The encoding apparatus as set forth in claim 2, wherein the predetermined range is one frame of the original picture signal.

4. The encoding apparatus as set forth in claim 1, wherein said encoding apparatus executes binarization of each pixel value of the original picture signal based on the threshold value.

5. The encoding apparatus as set forth in claim 1, wherein the threshold value is a value in a gradation range of the original picture signal.

6. The encoding apparatus as set forth in claim 1, wherein said at least one threshold value is a fixed number of values that depend on a predetermined original picture signal.

7. The encoding apparatus as set forth in claim 1, wherein the original picture signal is a digital picture signal.

8. An encoding apparatus, comprising:
   a uniformly random number generating portion for generating uniformly random numbers; and
   an encoding portion for encoding each pixel value of an original picture signal based on a compared result of at least one threshold value that is set based on the uniformly random numbers and a pixel value of the original picture signal;
   wherein said encoding portion encodes each pixel value of the original picture signal a plurality of times, and
   wherein said uniformly random number generating portion generates a different uniformly random number for encoding each pixel value of the original picture signal a plurality of times.

9. The encoding apparatus as set forth in claim 8, wherein said encoding portion successively executes a process for successively encoding each pixel value in a predetermined range of the original picture signal a plurality of times.

10. The encoding apparatus as set forth in claim 9, wherein the predetermined range is one frame of the original picture signal.

11. A decoding apparatus for decoding an original picture signal from an encoded picture signal of which each pixel value of an original picture signal is encoded based on a compared result of a threshold value that is set based on a uniformly random number and a pixel value of the original picture signal, the encoded picture signal having an encoded value for each pixel value, comprising:
    a cumulating portion for cumulating the encoded values of the encoded picture signal for each pixel value of the original picture signal;
    a decoding portion for decoding the encoded values cumulated by said cumulating portion for each pixel value of the original picture signal based on the number of times counted by a counting portion; and
    a sampling portion for sampling the encoded values of the encoded picture signal.

12. A decoding apparatus for decoding an original picture signal from an encoded picture signal of which each pixel value of an original picture signal is encoded based on a compared result of a threshold value that is set based on a uniformly random number and a pixel value of the original picture signal, the encoded picture signal having an encoded value for each pixel value, comprising:
    a cumulating portion for cumulating the encoded values of the encoded picture signal for each pixel value of the original picture signal;
    a decoding portion for decoding the encoded values cumulated by said cumulating portion for each pixel value of the original picture signal based on the number of times counted by a counting portion; and
    a sampling portion for sampling the encoded values of the encoded picture signal,
    wherein said cumulating portion cumulates the encoded values sampled by said sampling portion.

13. The decoding apparatus as set forth in claim 12, wherein said sampling portion variably sets a sampling period for which the encoded values are sampled.

14. The decoding apparatus as set forth in claim 11, wherein said decoding portion decodes the original picture signal based on a predetermined gradation value that represent the number of gradation levels.

15. The decoding apparatus as set forth in claim 11, wherein the gradation value is variable.

16. The decoding apparatus as set forth in claim 11, wherein the original picture signal is a digital picture signal.

17. The decoding apparatus as set forth in claim 11, wherein the encoded values are binary values.

18. A decoding apparatus for decoding an original picture signal from an encoded picture signal of which each pixel value of an original picture signal is encoded based on a compared result of a threshold value that is set based on a uniformly random number and a pixel value of the original picture signal, the encoded picture signal having an encoded value for each pixel value, comprising:
    a cumulating portion for cumulating the encoded values of the encoded picture signal for each pixel value of the original picture signal;
    a decoding portion for decoding the encoded values cumulated by said cumulating portion for each pixel value of the original picture signal based on the number of times counted by a counting portion; and
    a controlling portion for causing said cumulating portion to stop cumulating the encoded values.

19. The decoding apparatus as set forth in claim 18,
wherein said controlling portion causes said cumulating portion to stop cumulating the encoded values based on command information that is input by the user.

20. The decoding apparatus as set forth in claim 18,
wherein said controlling portion causes said cumulating portion to stop cumulating the encoded values when the picture quality of the original picture signal decoded from the encoded values exceeds a predetermined reference value.

21. The decoding apparatus as set forth in claim 20,
wherein said controlling portion determines that the picture quality exceeds the predetermined reference value when the counting portion has counted the predetermined number of times that said cumulating portion has cumulated each pixel of the original picture signal.

22. An encoding method, comprising the steps of:
generating uniformly random numbers;
encoding each pixel value of an original picture signal based on a compared result of at least one threshold value that is set based on the uniformly random numbers and a pixel value of the original picture signal; and
adding a synchronous transmission signal that includes at least either a horizontal synchronous signal, a vertical synchronous signal, or a sequential synchronous signal or the like.

23. A decoding method for decoding an original picture signal from an encoded picture signal of which each pixel value of an original picture signal is encoded based on a compared result of a threshold value that is set based on a uniformly random number and a pixel value of the original picture signal, the encoded picture signal having an encoded value for each pixel value, comprising the steps of:
cumulating the encoded values of the encoded picture signal for each pixel value of the original picture signal;
counting the number of times cumulated at the cumulating step; and
decoding the encoded values cumulated at the cumulating step for each pixel value of the original picture signal based on the number of times counted at the counting step.

24. A record medium from which a computer reads a program that causes the computer to perform the steps of:
generating uniformly random numbers;
encoding each pixel value of an original picture signal based on a compared result of at least one threshold value that is set based on the uniformly random numbers and a pixel value of the original picture signal; and
adding a synchronous transmission signal that includes at least either a horizontal synchronous signal, a vertical synchronous signal, or a sequential synchronous signal or the like.

25. A record medium from which a computer reads a program that causes the computer to decode an original picture signal from an encoded picture signal of which each pixel value of an original picture signal is encoded based on a compared result of a threshold value that is set based on a uniformly random number and a pixel value of the original picture signal, the encoded picture signal having an encoded value for each pixel value, the program comprising the steps of:
cumulating the encoded values of the encoded picture signal for each pixel value of the original picture signal;
counting the number of times cumulated at the cumulating step; and
decoding the encoded values cumulated by said cumulating portion for each pixel value of the original picture signal based on the number of times counted at the counting step.

26. An encoding apparatus, comprising:
a uniformly random number generating portion for generating uniformly random numbers;
an encoding portion for encoding an original signal based on a compared result of at least one threshold value that is set based on the uniformly random numbers and each signal value of the original signal; and
a transmission signal generating portion for adding a synchronous signal that includes at least either a horizontal synchronous signal, a vertical synchronous signal, or a sequential synchronous signal.

27. The encoding apparatus as set forth in claim 26,
wherein said encoding portion repeatedly encodes each of all signal values in a predetermined range of the original signal, one signal value at a time.

28. An encoding apparatus, comprising:
a uniformly random number generating portion for generating uniformly random numbers; and
an encoding portion for encoding an original signal based on a compared result of at least one threshold value that is set based on the uniformly random numbers and each signal value of the original signal;
wherein each signal value of the original signal is encoded a plurality of times, and
wherein said uniformly random number generating portion generates a different uniformly random number for encoding each signal value of the original signal a plurality of times.

29. A decoding apparatus for decoding an original signal from an encoded signal of which each signal value of an original signal is encoded based on a compared result of a threshold value that is set based on a uniformly random number and a signal value of the original signal, the encoded signal having an encoded value for each signal value, comprising:
a cumulating portion for cumulating the encoded values of the encoded signal for each signal value of the original signal;
a counting portion for counting the number of times cumulated; and
a decoding portion for decoding the encoded values cumulated by said cumulating portion for each signal value of the original signal based on the number of times counted by said counting portion.

30. An encoding method, comprising the steps of:
generating uniformly random numbers;
encoding each signal value of an original signal based on a compared result of at least one threshold value that is set based on the uniformly random numbers and each signal value that is an information unit of the original signal; and
adding a synchronous transmission signal that includes at least either a horizontal synchronous signal, a vertical synchronous signal, or a sequential synchronous signal or the like.

31. A decoding method for decoding an original signal from an encoded signal of which each signal value of an original signal is encoded based on a compared result of a threshold value that is set based on a uniformly random number and a signal value of the original signal, the encoded signal having an encoded value for each signal value, comprising the steps of:

cumulating the encoded values of the encoded signal for each signal value of the original signal;
counting the number of times cumulated; and
decoding the encoded values cumulated at the cumulating step for each signal value of the original signal based on the number of times counted at the counting step.

32. A record medium from which a computer reads a program that causes the computer to perform the steps of:
generating uniformly random numbers;
encoding each signal value of an original signal based on a compared result of at least one threshold value that is set based on the uniformly random numbers and each signal value of the original signal; and
adding a synchronous transmission signal that includes at least either a horizontal synchronous signal, a vertical synchronous signal, or a sequential synchronous signal.

33. A record medium from which a computer reads a program that causes the computer to decode an original signal from an encoded signal of which each signal value of an original signal is encoded based on a compared result of a threshold value that is set based on a uniformly random number and a signal value of the original signal, the encoded signal having an encoded value for each signal value, the program comprising the steps of:
cumulating the encoded values of the encoded signal for each signal value of the original signal;
counting the number of times cumulated; and decoding the encoded values cumulated at the cumulating step for each signal value of the original signal based on the number of times counted at the counting step.

34. An encoding apparatus comprising:
a uniformly random number generating portion for generating uniformly random numbers;
an encoding portion for encoding each pixel value of an original picture signal based on a compared result of at least one threshold value that is set based on the uniformly random numbers and a pixel value of the original signal; and
a transmission signal generating portion for adding a synchronous signal that includes at least either a horizontal synchronous signal, a vertical synchronous signal, or a sequential synchronous signal;
wherein said encoding portion encodes each pixel value of the original picture signal a plurality of times.

35. A decoding apparatus for decoding an original picture signal from an encoded picture signal of which each pixel value of an original picture signal is encoded based on a compared result of a threshold value that is set based on a uniformly random number and a pixel value of the original picture signal, the encoded picture signal having an encoded value for each pixel value, comprising:
a cumulating portion for cumulating the encoded values of the encoded picture signal for each pixel value of the original picture signal;
a counting portion for counting the number of times cumulated at the cumulating portion; and
a decoding portion for decoding the encoded values cumulated by said cumulating portion for each pixel value of the original picture signal based on the number of times counted by a counting portion.

36. A decoding apparatus for decoding an original picture signal from an encoded picture signal of which each pixel value of an original picture signal is encoded based on a compared result of a threshold value that is set based on a uniformly random number and a pixel value of the original picture signal, the encoded picture signal having an encoded value for each pixel value, comprising:
a cumulating portion for cumulating the encoded values of the encoded picture signal for each pixel value of the original picture signal;
a counting portion for outputting the number of times cumulated at the cumulating portion; and
a decoding portion for decoding the encoded values cumulated by said cumulating portion for each pixel value.

37. An encoding method comprising the steps of:
generating uniformly random numbers;
encoding each pixel value of an original picture signal based on a compared result of at least one threshold value that is set based on the uniformly random numbers and a pixel value of the original signal; and
a transmission signal generating portion for adding a synchronous signal that includes at least either a horizontal synchronous signal, a vertical synchronous signal, or a sequential synchronous signal;
wherein each pixel value of the original picture signal is encoded a plurality of times.

38. A record medium from which a computer reads a program that causes the computer to perform the steps of:
generating uniformly random numbers;
encoding each pixel value of an original picture signal based on a compared result of at least one threshold value that is set based on the uniformly random numbers and a pixel value of the original picture signal; and
a transmission signal generating portion for adding a synchronous signal that includes at least either a horizontal synchronous signal, a vertical synchronous signal, or a sequential synchronous signal;
wherein each pixel value of the original picture signal is encoded a plurality of times.

39. A decoding method for decoding an original picture signal from an encoded picture signal of which each pixel value of an original picture signal is encoded based on a compared result of a threshold value that is set based on a uniformly random number and a pixel value of the original picture signal, the encoded picture signal having an encoded value for each pixel value, comprising the steps of:
cumulating the encoded values of the encoded picture signal for each pixel value of the original picture signal;
counting the number of times cumulated at the cumulating step;
outputting the number of times cumulated; and
decoding the encoded values cumulated at the cumulating step for each pixel value of the original picture signal based on the number of times counted at the counting step.

* * * * *